US012807188B2

(12) United States Patent
Jeyakumaran et al.

(10) Patent No.: US 12,807,188 B2
(45) Date of Patent: Nov. 24, 2026

(54) PROVIDING COORDINATED USER INTERFACE EXPERIENCES FOR REQUESTOR DEVICES ACROSS AUTONOMOUS VEHICLE PROVIDERS AND DEVICES

(71) Applicant: Lyft, Inc., San Francisco, CA (US)

(72) Inventors: Vithushan Jeyakumaran, San Francisco, CA (US); Young Kyo Kim, San Francisco, CA (US); Rebecca Archangela Frazzano, Boulder, CO (US); Philippe Charles Amilcar Mizrahi, San Francisco, CA (US); Alexander McNaughton Luke Wallace, Brooklyn, NY (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/314,633

(22) Filed: May 9, 2023

(65) Prior Publication Data

US 2024/0375686 A1 Nov. 14, 2024

(51) Int. Cl.
*B60W 60/00* (2020.01)
*B60W 50/14* (2020.01)
(Continued)

(52) U.S. Cl.
CPC ...... *B60W 60/00253* (2020.02); *B60W 50/14* (2013.01); *G06Q 50/40* (2024.01); *H04W 4/40* (2018.02); *B60W 2050/146* (2013.01)

(58) Field of Classification Search
CPC ........... B60W 60/00253; B60W 50/14; B60W 2050/146; G06Q 50/40; H04W 4/40
See application file for complete search history.

(56) References Cited

U.S. PATENT DOCUMENTS 9,953,538 B1 * 4/2018 Matthiesen ............ B60Q 1/482
11,618,320 B1 4/2023 Austria et al.
(Continued)

OTHER PUBLICATIONS

Siegel et al, J. E. A Survey of the Connected Vehicle Landscape—Architectures, Enabling Technologies, Applications, and Development Areas, Google Scholar, IEEE Transactions on Intelligent Transportation Systems, vol. 19, No. 8, Aug. 2018, p. 2391-2406. (Year: 2018).*

(Continued)

*Primary Examiner* — Russell Frejd
(74) *Attorney, Agent, or Firm* — Keller Preece PLLC

(57) ABSTRACT

The present disclosure relates to systems, non-transitory computer-readable media, and methods for synchronously displaying, a first interface on a requestor mobile computing device and a second interface on an autonomous vehicle computing device based on a ride state. For example, the autonomous vehicle synchronization system provides effective communication during a transportation request fulfilled by an autonomous vehicle by synchronously providing for display the first interface and the second interface based on the ride state. For example, in response to receiving a digital transportation request, the autonomous vehicle synchronization system can monitor signals from a requestor mobile computing device and/or the autonomous vehicle computing device. Based on the monitored signals, the autonomous vehicle synchronization system determines the ride state and generates the first interface and second interface and provides, for synchronous display, the first and second interfaces.

20 Claims, 15 Drawing Sheets

(51) Int. Cl.
*G06Q 50/40* (2024.01)
*H04W 4/40* (2018.01)

(56) References Cited

U.S. PATENT DOCUMENTS

| | | | | |
|---|---|---|---|---|
| 2017/0169366 | A1* | 6/2017 | Klein | G06Q 10/02 |
| 2018/0129221 | A1* | 5/2018 | Mandeville-Clarke | B60K 35/10 |
| 2018/0240344 | A1* | 8/2018 | Matthiesen | G08G 1/005 |
| 2020/0219050 | A1* | 7/2020 | Spath | G06Q 10/0832 |
| 2020/0219397 | A1* | 7/2020 | Matthiesen | G08G 1/166 |
| 2021/0200217 | A1* | 7/2021 | Nix | H04W 12/64 |
| 2021/0302177 | A1* | 9/2021 | Cun | G01C 21/3438 |

OTHER PUBLICATIONS

Ridhawi et al, I.A. Design Guidelines for Cooperative UAV—supported Services and Applications, Google Scholar, ACM Journals, ACM Computing Surveys, vol. 54, No. 9, Article 185, Oct. 2021, p. 1-35. (Year: 2021).*

Nikitas et al, A. How Can Autonomous and Connected Vehicles, Electromobility, BRT, Hyperloop, Shared Use Mobility-As-A-Service Shape Transport Futures for the Context of Smart Cities?, Google Scholar, MDPI, Urban Science, vol. 1, Iss. 4, Nov. 2017, p. 1-21. (Year: 2017).*

Seng et al, K.P. Ridesharing and Crowdsourcing for Smart Cities: Technologies, Paradigms and Use Cases, Google Scholar; IEEE Access, vol. 11, Feb. 2023, p. 18038-18081. (Year: 2023).*

* cited by examiner

PROVIDING COORDINATED USER INTERFACE EXPERIENCES FOR REQUESTOR DEVICES ACROSS AUTONOMOUS VEHICLE PROVIDERS AND DEVICES

BACKGROUND

Recent years have seen significant development in transportation matching systems utilizing autonomous vehicles to fulfill transportation requests. For example, conventional transportation matching systems can match available autonomous vehicles with requestor devices and utilize web and mobile applications to communicate between third-party servers and requestor mobile computing devices. Although, existing transportation matching systems can utilize computer networks and applications to provide up to date transportation information to requestor mobile computing devices such systems suffer from a number of technical problems, particularly in flexibility, efficiency, and precision of implementing computer systems.

For instance, conventional systems suffer from technical flexibility concerns. For instance, conventional systems often provide digital communications via provider computing devices, but this rigid approach often fails to provide sufficient communication in autonomous vehicle implementations. Indeed, without a human driver, the rigid approach of conventional systems often causes confusion or miscommunications during a transportation service. Relatedly, due to the lack of control and limited information, some conventional systems, require users to navigate to alternative systems to find information about the digital transportation request or, if possible, to make changes to the digital transportation service and/or autonomous vehicle fulfilling the digital transportation request.

Additionally, existing systems are inefficient. For instance, as mentioned existing systems often provide information about the digital transportation request on a graphical user interface ("GUI") of a requestor mobile computing device. Providing such information on a small screen limits the screen space and displayable options on the GUI of the requestor mobile computing device. As a result, displaying limited information on the small GUI increases passenger interaction with the GUI because a passenger must search, scroll, and/or navigate through the GUI to find relevant information or access other digital transportation service options. This multiplies time, user interactions, and computer resources of implementing devices.

In addition, some conventional autonomous vehicle systems are also inaccurate or functionally deficient in providing digital communication during critical junctions of the digital transportation request. To illustrate because autonomous vehicles do not have drivers, there is no effective avenue for quickly resolving misunderstandings between the autonomous vehicle, the requestor mobile computing device, and/or requestor. For example, at the end of a transportation request, some existing autonomous vehicle systems often cause confusion and miscommunication because of the lack of a driver available to indicate when a ride has ended.

Furthermore, conventional systems are rigid in that they tend to communicate via a specific device controlled by the implementing system. For example, some systems control autonomous vehicles and thus provide information via one or more autonomous vehicle devices. However, this rigid approach also fails to remedy many of the deficiencies above, inasmuch as these devices fail to provide sufficient information, communication, and support to requestors utilizing these conventional systems.

These along with additional problems and issues exist with regard to conventional autonomous vehicle transportation systems.

BRIEF SUMMARY

Embodiments of the present disclosure provide benefits and/or solve one or more of the foregoing or other problems in the art with systems, non-transitory computer-readable media, and methods for generating graphical user interfaces ("GUI") that synchronously provide dynamic GUIs across multiple devices (including devices for various requestors and autonomous vehicle operations providers). In some embodiments, the disclosed systems can monitor signals from a requestor mobile computing device and/or signals from an autonomous vehicle computing device by utilizing an autonomous vehicle synchronization system. Based on the signals, the disclosed systems can determine a ride state for a digital transportation request (e.g., digital transportation service) and generate one or more synchronized GUIs over various devices associated with the digital transportation request. For instance, upon generating the GUIs, the disclosed system can surface a first GUI to the requestor mobile computing device and synchronously surface a second GUI via a requestor autonomous vehicle display of the autonomous vehicle mobile computing device. For example, the disclosed systems can provide intuitive selectable elements on the GUI of the requestor mobile computing device while harmoniously providing intuitive selectable elements on the GUI of the requestor autonomous vehicle display of the autonomous vehicle computing mobile device. In some embodiments, the disclosed systems can determine a change in the ride state and update the GUIs of the requestor mobile computing device and the autonomous vehicle mobile computing device based on the new ride state.

Furthermore, the disclosed systems can provide synchronous GUIs across different requestor computing devices and autonomous vehicle operation providers. For example, the disclosed systems can flexibly integrate across autonomous vehicle providers to provide synchronized graphical user interfaces to different requestor autonomous vehicle displays running on different platforms. Similarly, the disclosed systems can flexibly communicate to provide synchronous displays for different requestor mobile computing devices as they rotate through different autonomous vehicles. Thus, the disclosed systems can provide a coordinated and synchronized interface experience for requestors utilizing different requestor mobile devices across different autonomous vehicle operation platforms.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below. The drawings are not necessarily drawn to scale.

DETAILED DESCRIPTION

Figure 1:
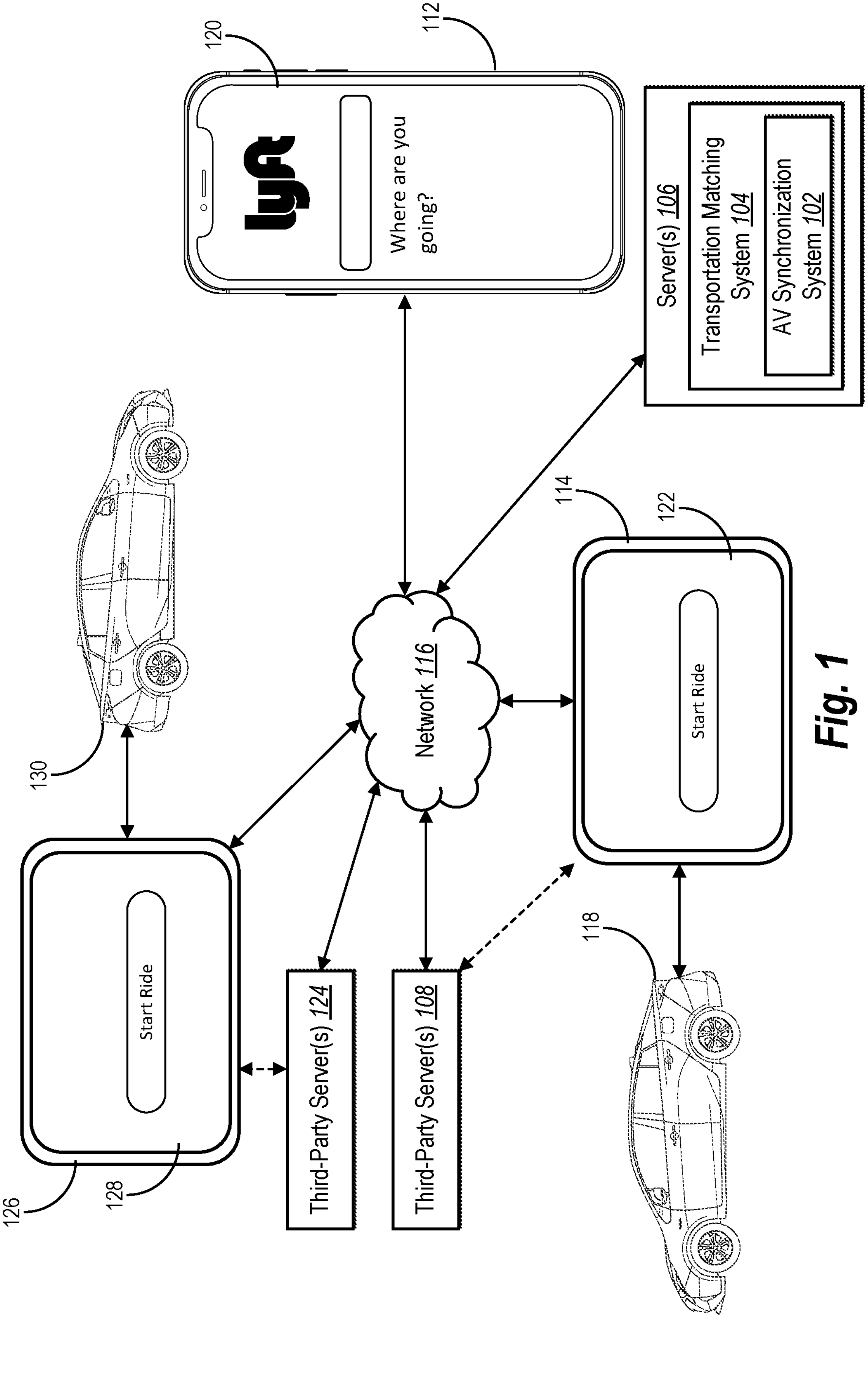
FIG. 1 illustrates a diagram of an environment in which an autonomous vehicle synchronization system can operate in accordance with one or more embodiments.

This disclosure describes one or more embodiments of an autonomous vehicle synchronization system generating improved graphical user interfaces that provide effective communication by providing synchronous messages across multiple devices, including autonomous vehicle devices (operated by different autonomous vehicle operation platforms) and requestor mobile devices (operated by a multitude of different requestors). For example, the autonomous vehicle synchronization system receives a digital transportation request from a requestor mobile computing device and monitors signals from the requestor mobile computing device and/or an autonomous vehicle computing device of the autonomous vehicle matched with digital transportation request. In particular, in one or more implementations, the autonomous vehicle synchronization system determines a ride state based on the monitored signals from the requestor mobile computing device and/or the autonomous vehicle computing device. In certain implementations, based on the ride state, the autonomous vehicle synchronization system generates one or more interfaces to concurrently surface across multiple devices. For example, based on the ride state, the autonomous vehicle synchronization system generates a first interface and a second interface and synchronously provide for display the first interface via the requestor mobile computing device and the second interface via the requestor autonomous vehicle display of the autonomous vehicle computing device.

As indicated above, the autonomous vehicle synchronization system receives a digital transportation request from the requestor mobile computing device and in response monitors signals from the requestor mobile computing device and the autonomous vehicle computing device of the autonomous vehicle. For instance, the autonomous vehicle synchronization system can identify signals regarding the conditions and/or status of autonomous vehicle and/or the autonomous vehicle computing device from third-party server(s) providing the autonomous vehicle. Additionally, in some embodiments, the autonomous vehicle synchronization system pulls information from the requestor mobile computing device. For example, in one or more implementations, the autonomous vehicle synchronization system monitors the location of the requestor mobile computing device by pulling GPS signals from the requestor mobile computing device.

In addition to monitoring signals from the autonomous vehicle computing device and/or the requestor mobile computing device, the autonomous vehicle synchronization system can determine the ride state based on the monitored signals. In particular, the autonomous vehicle synchronization system can define parameters/conditions corresponding to a ride state and based on the received signals indicating a fulfillment of the parameters, determine the ride state. For example, based on receiving GPS signals of the location of the autonomous vehicle computing device, the autonomous vehicle synchronization system can determine that the autonomous vehicle is in pulling-over state because the autonomous vehicle is within a threshold distance from a drop-off location associated with the digital transportation request.

In addition to determining a ride state, the autonomous vehicle synchronization system can generate multiple intuitive interfaces for various devices associated with the digital transportation request based on the ride state. For instance, in one or more embodiments, the autonomous vehicle synchronization system generates a first interface and a second interface based on the ride state. In one or more embodiments, the autonomous vehicle synchronization system updates the first interface and the second interface when the ride state changes. In some implementations, the first interface and second interface share selectable elements. For example, based on receiving signals indicating a passenger entering the autonomous vehicle and putting on a seat belt, the autonomous vehicle synchronization system can generate a shared selectable start ride element on the first interface and the second interface. Relatedly, in one or more embodiments, the first interface and second interface have different selectable elements. For example, based on the digital transportation request commencing, the second interface may comprise a frequently asked questions ("FAQ") selectable element while the first interface does not comprise an FAQ element.

As mentioned above, the autonomous vehicle synchronization system can generate multiple intuitive interfaces based on the ride state. In one or more embodiments, the autonomous vehicle synchronization system can, provide for synchronous display, the multiple interfaces across different devices. For example, in some cases, the autonomous vehicle synchronization system provides for display the first interface on the requestor mobile computing device while synchronously displaying the second interface on the requestor autonomous vehicle display of the autonomous vehicle computing device. For example, in one or more implementations, when the ride status changes, the autonomous vehicle synchronization system updates the first interface on the requestor mobile computing device and the second interface on the requestor autonomous vehicle display. For example, based on the autonomous vehicle synchronization system determining an arrival state, the autonomous vehicle synchronization system updates the first and second interface and synchronously surfaces the updated interfaces on the requestor mobile computing device and the requestor autonomous vehicle display to indicate that it is safe for the passenger to exit the vehicle.

Furthermore, in one or more embodiments, the autonomous vehicle synchronization system operates across different autonomous vehicle providers (with different autonomous vehicle operation servers) and different requestor mobile devices. For example, in one or more implementations, the autonomous vehicle synchronization system can synchronize user interfaces for autonomous vehicles operated by different providers, utilizing different APIs, different formats, and different capacities. Similarly, the autonomous vehicle synchronization system can coordinate within the same autonomous vehicle to provide synchronized interfaces for different requestor mobile devices at different ride stages. Thus, the autonomous vehicle synchronization system can provide synchronized and consistent user interface experiences for various requestor mobile devices.

The autonomous vehicle synchronization system provides many advantages and benefits over conventional systems and methods. For example, the autonomous vehicle synchronization system can provide improved flexibility. In particular, the autonomous vehicle synchronization system can flexibly synchronize user interfaces across multiple devices corresponding to an autonomous vehicle transportation request. This more flexible approach results in more consistent digital communication in autonomous vehicles and reduces the number of users that navigate to alternate systems or transportation request types. In addition, the autonomous vehicle synchronization system more flexibly provides for display various interfaces even when working with third-party vehicles/devices. To illustrate, the autonomous vehicle synchronization system can generate and provide for synchronous display similar interfaces to an autonomous vehicle computing device where the autonomous vehicle synchronization system has unlimited access to the autonomous vehicle computing device and another autonomous vehicle computing device where the autonomous vehicle synchronization system does not have direct access to the autonomous vehicle computing device. Thus, the autonomous vehicle synchronization system can receive varying degrees of information from autonomous vehicle computing device while surfacing comparable interfaces via the autonomous vehicle computing device.

Additionally, the autonomous vehicle synchronization system improves GUI efficiency. In particular, the autonomous vehicle synchronization system efficiently utilizes space on the GUI of various devices to intuitively and effectively communicate information about the transportation request. For instance, based on the synchronized interfaces, the autonomous vehicle synchronization system decreases time, user interfaces in navigating through multiple windows and applications, and corresponding utilization of computer resources.

Moreover, the autonomous vehicle synchronization system overcomes technical barriers related to autonomous vehicle communication. For instance, the autonomous vehicle synchronization system provides more effective communication by providing messages across multiple devices. For instance, the synchronous display of multiple interfaces across various devices prevents miscommunication and confusion at critical junctions during a digital transportation request. For example, the autonomous vehicle synchronization system provides synchronous interfaces that clearly indicate when it is safe to exit the vehicle.

Furthermore, the autonomous vehicle synchronization system provides consistent user interface experiences across requestor mobile devices and autonomous vehicles of various autonomous vehicle operation providers. Indeed, the autonomous vehicle synchronization system can interact with different autonomous vehicle operation server systems that provide various levels of access to autonomous vehicle computing devices to synchronize user interfaces with requestor provider devices and the autonomous computing devices.

As indicated by the foregoing discussion, the present disclosure utilizes a variety of terms to describe features and advantages of the autonomous vehicle synchronization system. For example, as used herein, the term "requestor mobile computing device" refers to a device (corresponding to a requestor) that submits a request for transportation services. In particular, the term "requestor mobile computing device" can include a computing device that places a query identifying a need for transportation from a geographic location to another geographic location. To illustrate, a requestor device can include a mobile phone, a tablet, and a computer, any of which can place a request utilizing a mobile application or a web-based application. After the transportation matching system matches a requestor (or a requestor device) with a provider (or a provider device), the requestor can await pickup by the provider at a predetermined pick-up location. Upon pick-up, the provider transports the requestor to a drop-off location specified in the digital transportation request. Accordingly, a requestor can refer to (i) a person who requests a request or other form of transportation but who is still waiting for pickup or (ii) a person whom a transportation vehicle has picked up and who is currently riding within the transportation vehicle to a drop-off location.

As used herein, the term "autonomous vehicle computing device" refers to a device (corresponding to an autonomous vehicle) that assists in operation of an autonomous transportation vehicle. For instance, an autonomous vehicle computing device refers to a mobile device such as a tablet, computer, or smart phone that relays information about the digital transportation request or the autonomous vehicle to the autonomous vehicle synchronization system or third-party server(s). An autonomous vehicle computing device also refers to a headless computing device integrated within the autonomous vehicle (e.g., under the dashboard). For example, the autonomous vehicle computing device can indicate that the autonomous vehicle is available to fulfill a digital transportation request from one geographic location to another geographic location. As another example, the autonomous vehicle computing device can indicate the location of the autonomous vehicle or ride status to the autonomous vehicle synchronization system and/or third-party servers. Additionally, and autonomous vehicle computing device may include a requestor autonomous vehicle display.

As used herein, the term "requestor autonomous vehicle display" refers to a display device of an autonomous vehicle computing device (e.g., tablet or computer) that displays information about the digital transportation request. For instance, the requestor autonomous vehicle display may provide for display one or more selectable elements related to the digital transportation request or autonomous vehicle. To illustrate, the requestor autonomous vehicle display may provide for display selectable elements that modify conditions in the autonomous vehicle (e.g., temperature, volume, lighting, etc.). Additionally, the requestor autonomous vehicle display may provide for display messages about the status of the digital transportation request. For example, the requestor autonomous vehicle display may provide for display a message that it is safe to exit the vehicle. Moreover, the requestor autonomous vehicle display can provide for display and interactive map that shows the intended transportation route from a pickup location to a drop-off location.

As used herein, the term "digital transportation request" refers to a query by a requestor mobile computing device seeking a transportation service. In particular, a "digital transportation request" can refer to a request by a requestor mobile computing device to a transportation matching system to match the requestor mobile computing device with an autonomous vehicle for transportation service. To illustrate, a digital transportation request can include information about features associated with the digital transportation request such as: a desired pickup location, a desired drop-off location, a desired pickup time, a desired drop-off time, a wait time, a request type, a request device rating, a number of passengers, a transportation route, luggage, and/or special considerations for the transportation.

As used herein, the term "signal" refers to indicators communicating information about a requestor mobile computing device and/or autonomous vehicle computing device. In one or more embodiments, signals are based on the status of the device. For instance, the signals can be GPS signals indicating the location of the requestor mobile computing device and/or the autonomous vehicle computing device. In some cases, the signals are based on received user input. For example, in response to detecting a selection of a start ride element, the autonomous vehicle synchronization system can receive a start ride signal. As another example, volume signals from the requestor mobile computing device can indicate user input modifying the volume of music playing in the autonomous vehicle. Relatedly, signals from the autonomous vehicle computing device can communicate the availability of the autonomous vehicle computing device or user input modifying the temperature of the cabin of the autonomous vehicle.

As used herein, the term "ride state" refers to the state of the autonomous vehicle during a digital transportation request. In particular, a "ride state" is defined by a set of conditions and/or parameters related to the autonomous vehicle as it performs the digital transportation service. For instance, once one or more conditions associated with a specific ride state are fulfilled, the autonomous vehicle enters the specified ride state. In one or more embodiments, the autonomous vehicle synchronization system receives signals from the autonomous vehicle computing device and/or the requestor mobile computing device to determine the ride state. To illustrate, based on receiving signals regarding the location of the autonomous vehicle, the autonomous vehicle synchronization system can determine that the autonomous vehicle is in a mid-ride state. Moreover, as conditions of the autonomous vehicle changes, the ride state changes. For example, as the autonomous vehicle enters a threshold distance from the drop-off location, the ride state of the autonomous vehicle can change from a mid-ride state to a pulling-over state.

As used herein, the term "synchronous display" refers to concurrently displaying one or more interfaces across multiple computing devices. In particular, synchronous display includes surfacing one or more interfaces in a complementary manner so that selectable elements, messages, notifications, and/or options are communicated in unified manner. In some embodiments, synchronous display includes using similar color palettes, fonts, graphics, and/or stylings. For instance, the selectable elements on the first interface and second interface can have the same color scheme and shape. In some implementations, synchronous display includes displaying a shared selectable element on the first interface and the second interface. For example, in some embodiments, the first interface and the second interface include a shared selectable pull over element. Moreover, synchronous display can include updating the first interface and second interface based on detecting user input via the first interface or the second interface. For example, if the autonomous vehicle synchronization system detects a selection of the pull over element via the first interface, the autonomous vehicle synchronization system updates the first interface and second interface to indicate that the autonomous vehicle computing device is pulling over by finding a drop-off location.

As used herein, the term "autonomous vehicle provider" (or autonomous vehicle server system, autonomous vehicle operator, or autonomous vehicle service) refers to one or more entities, servers, or computing devices that communicate with and/or control autonomous vehicle computing devices. Thus, for example, different autonomous vehicle providers can control different autonomous vehicles and their corresponding autonomous vehicle computing devices. Different autonomous vehicle operation server systems can utilize different protocols, implement different application programming interfaces (APIs), and provide different levels of control (i.e., control levels) for autonomous vehicle computing devices and corresponding requestor autonomous vehicle displays.

Additional detail regarding the autonomous vehicle synchronization system will now be provided with reference to the figures. In particular, FIG. 1 illustrates a block diagram of a system environment for implementing an autonomous vehicle synchronization system 102 in accordance with one or more embodiments. As shown in FIG. 1, the environment includes the server(s) 106 housing the autonomous vehicle synchronization system 102 as part of a transportation matching system 104. The environment of FIG. 1 further includes a requestor mobile computing device 112, an autonomous vehicle computing device 114, an autonomous vehicle computing device 126, an autonomous vehicle 118, an autonomous vehicle 130, and a network 116. The server(s) 106 can include one or more computing devices to implement the autonomous vehicle synchronization system 102. The requestor mobile computing device 112, the autonomous vehicle computing device 114, and/or the autonomous vehicle computing device 126 may be or comprise one or more of a variety of computing devices as described in FIGS. 11-12. Additional description regarding the illustrated computing devices (e.g., the server(s) 106, the requestor mobile computing device 112, the autonomous vehicle computing device 114, and/or the autonomous vehicle computing device 126) is provided with respect to FIGS. 11-12 below.

As shown, the autonomous vehicle synchronization system 102 utilizes the network 116 to communicate with the requestor mobile computing device 112, the autonomous vehicle computing device 114, the autonomous vehicle computing device 126, the third-party server(s) 108, and the third-party server(s) 124. For example, the autonomous vehicle synchronization system 102 communicates with the requestor mobile computing device 112, the autonomous vehicle computing device 114, the autonomous vehicle computing device 126, the third-party server(s) 108, and the third-party server(s) 124 to match digital transportation requests received from the requestor mobile computing device 112 with the autonomous vehicle computing device 114 associated with the autonomous vehicle 118 and/or the autonomous vehicle computing device 126 associated with the autonomous vehicle 130. Indeed, the autonomous vehicle synchronization system 102 can monitor and communicate a status of the autonomous vehicle computing device 114 to provide an indicator for a location of the autonomous vehicle computing device 114 for display on a requestor mobile computing device 112 as, for example, a vehicle icon within a graphical map. In some embodiments, per device settings, the autonomous vehicle synchronization system 102 receives device information from the requestor mobile computing device 112 and pulls information from the autonomous vehicle computing device 114 (e.g., via a global positioning system associated with each device) such as location coordinates (e.g., latitude, longitude, and/or elevation), status (e.g., currently riding, not riding, available, or unavailable), and state (e.g., pre-ride state, mid-ride state, etc.) for matching requests.

To facilitate connecting requests with autonomous transportation vehicles (e.g., vehicles associated with autonomous vehicle computing devices), the autonomous vehicle synchronization system 102 communicates with the requestor mobile computing device 112 (e.g., through a requestor application 120), the autonomous vehicle computing device 114, and/or the autonomous vehicle computing device 126 (e.g., through an autonomous vehicle computing device application, the third-party server(s) 108, and/or the third-party server(s) 124). As indicated by FIG. 1, the requestor mobile computing device 112 includes a requestor application 120, and the autonomous vehicle computing device 114 and the autonomous vehicle computing device 126 include an autonomous vehicle computing device application. In many embodiments, the autonomous vehicle synchronization system 102 communicates with the requestor mobile computing device 112, the autonomous vehicle computing device 114, and the autonomous vehicle computing device 126 through the requestor application 120, the autonomous vehicle computing device application, the third-party server(s) 108, and/or the third-party server(s) 124 respectively, to, for example, receive and provide information including digital transportation request information (e.g., pick-up locations and/or drop-off locations) and autonomous vehicle computing device information (e.g., autonomous vehicle location, ride state, etc.).

Indeed, as mentioned above, the autonomous vehicle synchronization system 102 can operate with regard to multiple autonomous vehicle providers. As shown in FIG. 1, in some implementations, the third-party server(s) 108 correspond to a first autonomous vehicle provider and the third-party server(s) 124 correspond to a second autonomous vehicle provider. In one or more embodiments, the autonomous vehicle synchronization system 102 interacts with additional (e.g., a third, fourth, and/or fifth) autonomous vehicle providers. Moreover, as illustrated, the autonomous vehicle operation server systems can communicate with different autonomous vehicles and autonomous vehicle computing devices corresponding to the different providers.

In some embodiments, the requestor application 120 and the autonomous vehicle computing device application include computer-executable instructions that, when executed by the requestor mobile computing device 112, the autonomous vehicle computing device 114, and/or the autonomous vehicle computing device 126 cause the requestor mobile computing device 112, the autonomous vehicle computing device 114, and/or the autonomous vehicle computing device 126 to perform certain functions as described herein.

As indicated above, the autonomous vehicle synchronization system 102 can cause the requestor autonomous vehicle display 122 of the autonomous vehicle computing device 114 and/or the requestor mobile computing device to synchronously render visual indicators, messages, selectable elements, and an interactive map associated with digital transportation request. For example, in some cases, the autonomous vehicle synchronization system 102 synchronously surfaces shared selectable elements to the requestor autonomous vehicle display 122 of the autonomous vehicle computing device 114 and/or the requestor mobile computing device based on the ride state of the autonomous vehicle performing the digital transportation request.

Although FIG. 1 illustrates the environment having a particular number and arrangement of components associated with the autonomous vehicle synchronization system 102, in some embodiments, the environment may include more or fewer components with varying configurations. For example, in some embodiments, the autonomous vehicle synchronization system 102 can communicate directly with the requestor mobile computing device 112 and/or the autonomous vehicle computing device 114, bypassing the network 116. Moreover, the environment can include a variety of requestor mobile computing devices. In these or other embodiments, the autonomous vehicle synchronization system 102 can be housed on and/or implemented by (entirely or in part) the requestor mobile computing device 112. Additionally, the autonomous vehicle synchronization system can include or communicate with a database for storing digital transportation request information, requestor mobile computing device information, autonomous vehicle computing device information, autonomous vehicle information and/or other information described herein.

As mentioned, the autonomous vehicle synchronization system 102 can synchronously surface and update intuitive interfaces of the autonomous vehicle computing device and the requestor mobile computing device during a transportation service. For instance, FIG. 2 illustrates an overview of the autonomous vehicle synchronization system 102 providing, for synchronous display, a first interface via the requestor mobile computing device and a second interface via the requestor autonomous vehicle display in accordance with one or more embodiments.

Figure 2:
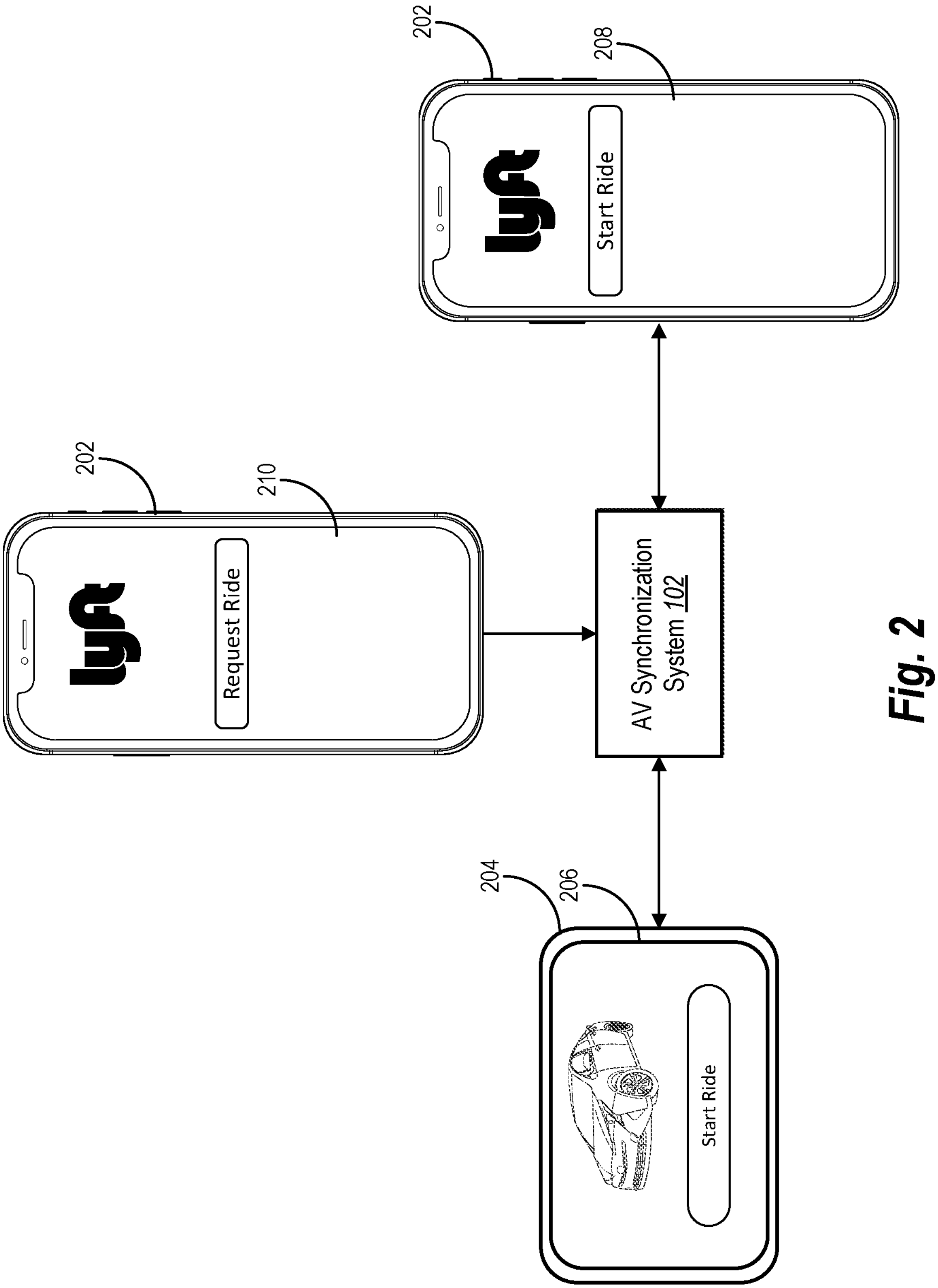
FIG. 2 illustrates an overview of the autonomous vehicle synchronization system providing for synchronous display a first interface via the requestor mobile computing device and a second interface via the requestor autonomous vehicle display in accordance with one or more embodiments.

Specifically, FIG. 2 shows the autonomous vehicle synchronization system 102 receiving a digital transportation request from a requestor mobile computing device 202 and matching the requestor mobile computing device 202 with an autonomous vehicle. Once matched, in one or more embodiments, the autonomous vehicle synchronization system 102 monitors signals from the requestor mobile computing device 202 and/or the autonomous vehicle computing device 204 of the autonomous vehicle. In some cases, the autonomous vehicle synchronization system 102 monitors signals based on the progress of the transportation request.

For example, in one or more embodiments, the autonomous vehicle synchronization system 102 can directly monitor GPS signals indicating the location of the requestor mobile computing device 202 and/or the autonomous vehicle computing device 204. Additionally, in some cases, the autonomous vehicle synchronization system 102 monitors signals based on receiving user input via a requestor autonomous vehicle display 206 of the autonomous vehicle computing device 204 and/or the graphical user interface 208 of the requestor mobile computing device 202. Additionally, in some cases, the autonomous vehicle synchronization system 102 monitors signals by pulling information (e.g., signals) about the location of the autonomous vehicle computing device 204 from a third-party server of an autonomous vehicle provider associated with the car.

As mentioned above, the autonomous vehicle synchronization system 102 can monitor signals from the requestor mobile computing device 202 and/or the autonomous vehicle computing device 204. In some embodiments, the autonomous vehicle synchronization system 102 determines a ride state based on the monitored signals from the requestor mobile computing device 202 and/or the autonomous vehicle computing device 204. For instance, the autonomous vehicle synchronization system 102 can define conditions that, when fulfilled, place the autonomous vehicle in a corresponding ride state. For example, based on receiving signals indicating fastened seatbelts of the autonomous vehicle and the autonomous vehicle synchronization system 102 receiving start ride signal based on detecting a selection of a start ride element, the autonomous vehicle synchronization system 102 can determine a start ride state for the autonomous vehicle.

As previously indicated, the autonomous vehicle synchronization system 102 can generate various interfaces based on the ride state of the autonomous vehicle. In particular, the autonomous vehicle synchronization system 102 can generate one or more interfaces that include messages, selectable elements, interactive maps, various indicators, and/or options related to the autonomous vehicle and/or transportation service. For instance, the autonomous vehicle synchronization system 102 can generate a first interface for the requestor mobile computing device 202 and a second interface for the requestor autonomous vehicle display 206. Moreover, in some implementations, the autonomous vehicle synchronization system 102 generates new interfaces based on changes in the ride state. For example, when the autonomous vehicle transitions from a start ride state to a mid-ride state, the autonomous vehicle synchronization system 102 can generate additional user interfaces that include new selectable elements, messages, notifications, and/or options for the interface of the requestor mobile computing device 202 and/or the requestor autonomous vehicle display 206. In one or more implementations, the first interface and the second interface share selectable elements. In some embodiments, the first interface and the second interface include different selectable elements. For example, based on the mid-ride state, the autonomous vehicle synchronization system 102 generates a first interface for the requestor mobile computing device 202 that includes a safety tools element while generating a second interface for the requestor autonomous vehicle display 206 that includes FAQ element.

In addition to generating a first interface and second interface based on the ride state, the autonomous vehicle synchronization system 102 can synchronously surface the first interface via the requestor mobile computing device 202 and the second interface via the requestor autonomous vehicle display 206. In particular, the autonomous vehicle synchronization system 102 can display both interfaces to provide for display selectable elements, messages, notifications, and/or options related to the transportation service and/or autonomous vehicle on the first interface and the second interface. For example, during the transportation service, the autonomous vehicle synchronization system 102 can display an edit ride element on the first interface and the second interface. Based on the autonomous vehicle synchronization system 102 receiving a selection of the edit ride element on the first interface via the requestor mobile computing device 202, the autonomous vehicle synchronization system 102 can update the second interface via the requestor autonomous vehicle display 206 to provide for display an edit ride field where the autonomous vehicle synchronization system 102 can receive a new drop-off address. Further detail regarding providing the first interface and second interface for synchronous display will be discussed in FIGS. 5A-5D.

Although not illustrated in FIG. 2, the autonomous vehicle synchronization system 102 can operate across multiple requestor devices and multiple autonomous vehicle computing devices (operated by multiple different autonomous vehicle providers). Thus, the autonomous vehicle synchronization system 102 can perform the acts described in FIG. 2 with regard to different requestor devices and different autonomous vehicle devices through different autonomous vehicle providers.

Figure 3:
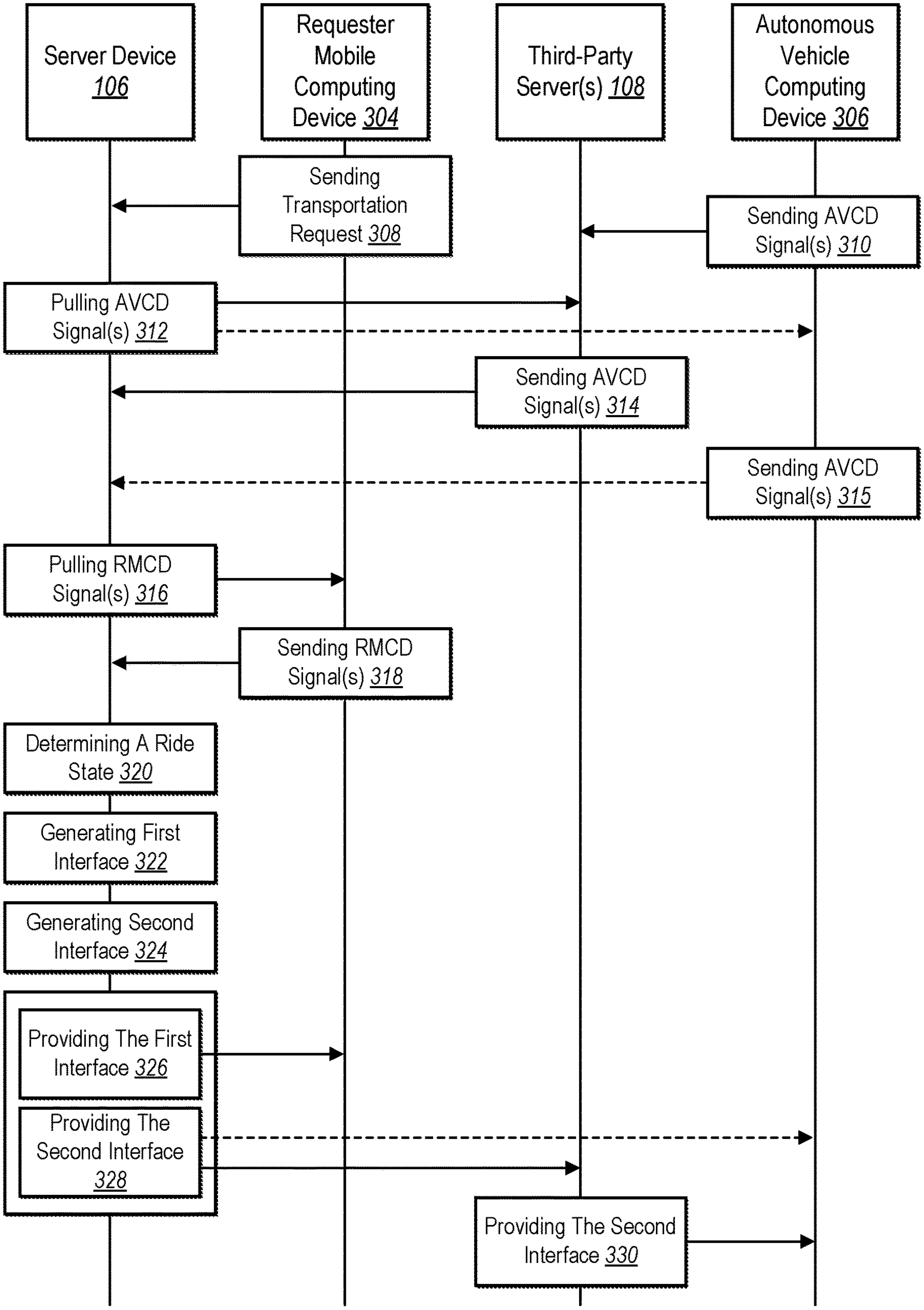
FIG. 3 illustrates the autonomous vehicle synchronization system monitoring signals from the requestor mobile computing device and the autonomous vehicle computing device and determining a ride state based on the signals in accordance with one or more embodiments.

As discussed above, the autonomous vehicle synchronization system 102 monitors signals from the requestor mobile computing device and the autonomous vehicle computing device and determines a ride state based on those signals. FIG. 3 shows a sequence flow diagram of multiple devices and systems communicating to generate and synchronously surface a first interface to the requestor mobile computing device and a second interface to the autonomous vehicle computing device.

As shown, FIG. 3 includes a series of acts performed by the autonomous vehicle synchronization system 102 via the server(s) 106, requestor mobile computing device 304, third party server(s) 108, and the autonomous vehicle computing device 306. In some embodiments, all of the devices are in communication with each other. For instance, the autonomous vehicle computing device 306 can communicate with the requestor mobile computing device 304, the third-party server(s) 108, and the autonomous vehicle computing device 306. In some cases, there is limited communication between the systems and devices. For example, in certain implementations, the autonomous vehicle synchronization system 102 does not communicate directly with the autonomous vehicle computing device 306; instead, the autonomous vehicle synchronization system 102 communicates with the autonomous vehicle computing device 306 through the third-party server(s) 108.

As shown, the series of acts includes an act 308 of the requestor mobile computing device 304 sending a transportation request. For instance, the requestor mobile computing device 304 detects input from a requestor to start a digital transportation request (e.g., transportation request) through an application or web browser. Further the requestor mobile computing device 304 detects that the transportation request is for an autonomous vehicle. For example, the requestor mobile computing device 304 detects user input selecting an autonomous vehicle to fulfill the transportation request.

As illustrated in FIG. 3, the series of acts includes an act 310 of the autonomous vehicle computing device 306 sending autonomous vehicle computing device signals to the third-party server(s) 108. In particular, the autonomous vehicle computing device 306 can send signals regarding the status and/or conditions of the autonomous vehicle. For example, in one or more embodiments, the autonomous vehicle computing device 306 can send signals about the availability, status, GPS location, conditions, etc. of the autonomous vehicle to the third-party server(s) 108. To illustrate, the autonomous vehicle computing device 306 can indicate to the third-party servers that the autonomous vehicle is available and ready to fulfill a transportation request. In some embodiments, the third-party server(s) 106 can request information about the autonomous vehicle from the autonomous vehicle computing device 306. For example, the third-party server(s) can request the location and/or availability of the autonomous vehicle from the autonomous vehicle computing device 306.

As shown the series of acts includes an act 312 of the server(s) 106 pulling signals from the autonomous vehicle computing device 306. In particular, based on allowed access to the autonomous vehicle computing device 306 from the third-party server(s) 108, the server(s) 106 pulls information from the autonomous vehicle computing device 306 via the third-party server(s) 108. For example, if the server(s) 106 has limited access to the autonomous vehicle computing device 306, the server(s) 106 can pull (e.g., request) information (e.g., availability signals, GPS location signals, ride status signals, travel speed signals, start ride signals etc.) of the autonomous vehicle computing device 306 from the third-party server(s) 108. In some embodiments, the third-party server(s) 108 sends availability signals, GPS location signals, ride status signals, start rids signals, pull-over signals, arrival signals etc. of the autonomous vehicle computing device 306 to the server(s) 106. For example, the third-party server(s) can send a GPS location signal of the autonomous vehicle computing device 306 to the server(s) 106.

In one or more embodiments, the server(s) 106 has direct access to the autonomous vehicle computing device 306. In particular, the server(s) 106 can pull information from the autonomous vehicle computing device 306. To illustrate, in some embodiments, the server(s) 106 bypasses the third-party server(s) and directly pulls GPS location information of the autonomous vehicle computing device 306, from the autonomous vehicle computing device 306 through an application or web browser on the autonomous vehicle computing device 306. In some embodiments, the server(s) 106 pulls information about the autonomous vehicle computing device 306 from the third-party server(s) 108, while directly pulling other information from the autonomous vehicle computing device 306.

As illustrated, the series of acts includes an act 314 of the third-party server(s) 108 sending signals of the autonomous vehicle computing device to the server(s) 106. In some embodiments, in response to the server(s) 106 pulling signals of the autonomous vehicle computing device 306, the third-party server(s) 108 relays signals received or alternatively requested from the autonomous vehicle computing device 306 to the server(s) 106. For example, in one or more embodiments, the third-party server(s) receives a pull-over signal indicating that the autonomous vehicle computing device 306 is pulling over. Subsequently, the third-party server(s) 108 sends the pull-over signal to the server(s) 106.

As shown in FIG. 3, the series of acts includes an act 316 of pulling signals from the requestor mobile computing device 304. For example, the server(s) 106 utilizes an application or web browser on the requestor mobile computing device 304 to pull signals from the requestor mobile computing device 304. For instance, the server(s) 106 can pull a signal indicating the GPS location and/or movements of the requestor mobile computing device 304. In some embodiments, the server(s) 106 pulls account information (e.g., name, rating, payment information, etc.) about the requestor associated with the requestor mobile computing device 304.

As shown in FIG. 3, the series of acts includes an act 315 of the autonomous vehicle computing device 306 sending autonomous vehicle computing device signal(s) directly to the server(s) 106. As mentioned above in some embodiments, the third-party server(s) 108 sends signals of the autonomous vehicle computing device to the server(s) 106. In some implementations, the server device has full access to the autonomous vehicle computing device and the autonomous vehicle computing device can bypass the third-party servers while sending signals. For example, in some cases the autonomous vehicle computing device 306 sends a GPS signal directly to the server(s) 106.

As illustrated in FIG. 3, the series of acts includes an act 316 of pulling requestor mobile computing device signal(s). As discussed above the server(s) 106 can pull information (e.g., signals) of the autonomous vehicle computing device 306. Relatedly, the server device can pull signals from the requestor mobile computing device 304. For example, through a requestor application or web browser, the server device can pull a GPS signal, start ride signal, unlock rear doors signal, pull-over signal, end ride signal, arrival signal, etc.

As further shown in FIG. 3, the series of acts includes an act 318 of sending signals of the requestor mobile computing device to the server(s) 106. In particular, in response to the server device pulling (e.g., requesting) signals of the requestor mobile computing device 30, the requestor mobile computing device 304 sends signals to the server(s) 106. For example, if the server device pulls a GPS signal of the requestor mobile computing device 304, the requestor mobile computing device 304 sends the GPS signal that includes information about the location of the requestor mobile computing device 304 to the server(s) 106. Alternatively, in some embodiments, the requestor mobile computing device 304 sends signals of the requestor mobile computing device 304 before the server(s) 106 pulls the signals.

As shown in FIG. 3 the series of acts includes and act 320 of determining a ride state. In particular, based on the monitored signals from the requestor mobile computing device 304 and/or the autonomous vehicle computing device 306, the server(s) 106 determines the execution of one or more conditions associated with the ride state. In particular, each ride state corresponds to a defined set of one or more conditions. In some cases, the server(s) 106 defines any number of ride states and the conditions corresponding to those ride states. In some embodiments, the ride states comprise a pre-ride state, mid-ride state, and/or arrival state. In one or more implementations, the server device includes more specific ride states. For example, the rides state can include a pre-ride pickup state, pre-ride entry state, start ride state, mid-ride state, comfort mode ride state, arriving soon state, pulling-over state, and/or arrival state.

As mentioned above, each ride state corresponds to a set of defined conditions. In some embodiments, meeting one or more of those conditions determines the ride state. For instance, in one or more implementations, a pre-ride pickup state occurs when the autonomous vehicle computing device arrives at the pickup location and the requestor mobile computing device 304 is within a threshold distance of the pickup location. In some cases, a pre-ride entry state occurs when the requestor mobile computing device unlocks the doors of the autonomous vehicle at the pickup location, the requestor enters the autonomous vehicle, or the autonomous vehicle computing device 306 determines the fastening of seatbelts.

As previously indicated, the server(s) 106 determines a ride state based on signals. In some embodiments, the server(s) 106 determines the pre-ride entry state based on signals of the autonomous vehicle computing device 306 indicating the fastening of seatbelts of the autonomous vehicle. In certain implementations, the server(s) 106 determines the pre-ride entry state based on signals of the requestor mobile computing device 304. For instance, the server device can determine a pre-ride entry state based on receiving an unlock rear doors signal from the requestor mobile computing device 304. Thus, the server(s) 106 determines a pre-ride entry state based on user input selecting an unlock rear doors element. In one or more cases, the server(s) 106 determines a pre-ride entry state based on the autonomous vehicle computing device 306 indicating the presence of the requestor in the autonomous vehicle. In certain embodiments, the server(s) 106 determines the pre-ride entry state based on signals from the autonomous vehicle computing device 306 and the requestor mobile computing device 304.

Additionally, the server(s) 106 can determine the change in the ride state based on signals of the requestor mobile computing device 304 and/or signals of the autonomous vehicle computing device 306 indicating one or more changes in conditions of the requestor mobile computing device 304 and/or the autonomous vehicle computing device 306. For instance, based on the GPS signal of the requestor mobile computing device 304 being within a threshold distance from the drop-off location, the server(s) 106 updates the ride state from a mid-ride state to a pulling-over state. In one or more embodiments, the server(s) 106 defines the conditions that correspond to the ride state and changes in conditions that trigger a different ride state.

Relatedly, in one or more cases, the server(s) 106 anticipates the change of a rides state. In particular, the server(s) 106 anticipates changes related to conditions of the transportation service, autonomous vehicle computing device 306, and/or requestor mobile computing device 304. For example, based on the estimated time of arrival (ETA) and remaining duration of the transportation service, the server(s) 106 anticipates a change in conditions of the requestor mobile computing device 304 and/or the autonomous vehicle computing device 306 that will trigger the ride state to change from the current ride state (e.g., mid-ride state) to the next ride state (e.g., pulling-over state).

In one or more embodiments, the vehicle synchronization system 102 determines the ride state utilizing one or more machine learning models. A machine learning model includes a computer representation that is tunable (e.g., trained) based on inputs to approximate unknown functions used for generating the corresponding outputs. In particular, a machine learning model includes a computer-implemented model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

Similarly, a neural network includes a machine learning model of interconnected artificial neurons (e.g., organized in layers) that communicate and learn to approximate complex functions and generate outputs. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

The vehicle synchronization system 102 can train a machine learning model to predict vehicle states based on the various signals from a requestor computing device and/or autonomous vehicle computing device. For example, the vehicle synchronization system 102 can encode these signals (e.g., utilizing one hot encoding or an encoder) and process the encoded signals via layers of a neural network or branches of a decision tree to generate a predicted state. The vehicle synchronization system 102 can then compare the predicted state with a ground truth state to determine a measure of loss (e.g., utilizing a loss function). The vehicle synchronization system 102 can then modify parameters of the machine learning model utilizing the measure of loss (e.g., by modifying neural network parameters or parameters of a decision tree to generate an improved result). The vehicle synchronization system 102 can iteratively train the machine learning model until reaching a stopping condition (e.g., based on a number of iterations or satisfying a convergence metric).

As shown in FIG. 3, the series of acts includes an act 322 of generating a first interface. In particular, the server(s) 106 generates a first interface comprising one or more selectable elements, messages, notifications, interactive maps, and/or options based on the ride state. For example, certain selectable elements, messages, notifications, interactive maps, options or any combination thereof correspond to certain ride states. For example, the server(s) 106 generates a first interface with a start ride element and fasten seatbelt message during the pre-ride state. Moreover, in one or more embodiments, the server(s) 106 updates the selectable elements, messages, notification, interactive maps, and/or options displayed on the first interface as the ride state changes. Examples of the first interface with various selectable elements, messages, notifications, and/or interactive maps based on the ride states are provided below in connection with FIGS. 4-5D.

As shown in FIG. 3, the series of acts includes an act 324 of the server(s) 106 generating a second interface. Like generating the first interface, the server(s) 106 generates the second interface including one or more selectable elements, messages, notifications, interactive maps, options, or any combination thereof based on the ride state. For example, based on a mid-ride state, the server(s) 106 generates the second interface with an interactive map showing the location of the autonomous vehicle, a FAQ element, a request support element, and a controls element. Additionally, in one or more embodiments, the server(s) 106 updates the second interface based on a change in the ride state. Examples of the second interface with one or more selectable elements, messages, notifications, interactive map(s), or any combination thereof are provided below in connection with FIGS. 5A-5D.

Additionally, in one or more implementations, the first interface and second interface share selectable elements. For instance, the first interface and second interface may share a start ride element, an edit ride element, an end ride selectable element, a controls element, a communication element, a pull over element, or a safety tools element.

As illustrated in FIG. 3, the series of acts includes an act 326 of providing the first interface to the requestor mobile computing device 304 and an act 328 of providing the second interface to the autonomous vehicle computing device 306. In particular, the act 326 and the act 328 include synchronously providing for display the first interface via the requestor mobile computing device 304 and the second interface via the requestor autonomous vehicle display of the autonomous vehicle computing device 306. To illustrate, the server(s) 106 effectively shares information about the transportation request by surfacing complementary interfaces (e.g., the first interface and the second interface) during the transportation service. Thus, the servers(s) 106 can provide information (e.g., to a third-party server, to the autonomous vehicle computing device, and/or to the requestor mobile computing device) to be synchronously displayed on a first interface via a requestor mobile computing device and on a second interface via a requestor autonomous vehicle display. Examples of the autonomous vehicle synchronization system 102 providing for synchronous display the first interface and second interface are provided below in connection with FIGS. 5A-5D.

As further illustrated in FIG. 3, the series of acts includes and act 330 of providing the second interface from the third-party server(s) 108 to the autonomous vehicle computing device 306. In particular, in some embodiments, when the server(s) 106 does not have access to the autonomous vehicle computing device 306, the third-party server(s) 108 can provide for display the second interface via the requestor autonomous vehicle display of the autonomous vehicle computing device 306.

Although FIG. 3 illustrates a series of acts for a particular requestor mobile computing device a particular set of third-party servers and a particular autonomous vehicle computing device, the autonomous vehicle synchronization system 102 can perform the series of acts described in relation to FIG. 3 with regard to multiple requestor devices, multiple third-party servers (i.e., multiple autonomous vehicle providers), and multiple autonomous vehicle computing devices.

Indeed, in one or more implementations, the autonomous vehicle synchronization system 102 selects between multiple autonomous vehicle providers (and corresponding autonomous vehicles and autonomous vehicle devices) in generating a transportation match for a transportation request. For instance, the autonomous vehicle synchronization system 102 can utilize a transportation matching algorithm (e.g., a heuristic or machine learning algorithm) to generate a match between an autonomous vehicle and a transportation request. The autonomous vehicle synchronization system 102 can consider a variety of factors such as distance, ETA, rating, price/cost, or availability in selecting a particular autonomous vehicle and autonomous vehicle provider. Thus, the autonomous vehicle synchronization system 102 can select between multiple different autonomous vehicle providers and select an autonomous vehicle to assign to a particular transportation request.

Moreover, upon performing the series of acts of FIG. 3, the autonomous vehicle synchronization system 102 receives an additional transportation request from an additional requestor mobile computing device. The autonomous vehicle synchronization system 102 can monitor the additional requestor mobile computing device and the autonomous vehicle computing device 306 to determine an additional ride state. Moreover, the autonomous vehicle synchronization system 102 can generate a third interface and a fourth interface and provide the third interface to the additional requestor mobile computing device and the fourth interface to the autonomous vehicle computing device. The autonomous vehicle synchronization system 102 can also update these interfaces upon detecting different ride states. Thus, the autonomous vehicle synchronization system 102 can dynamically adjust based on receiving different transportation requests from different requestor devices.

Furthermore, the autonomous vehicle synchronization system 102 can also dynamically adjust to different autonomous vehicle computing devices operated by different autonomous vehicle providers (e.g., additional autonomous vehicle operations server systems). For example, consider the circumstance where the third-party server(s) illustrated in FIG. 3 are operated by a first autonomous vehicle provider (e.g., a first autonomous vehicle operations server system). The autonomous vehicle synchronization system 102 can receive an additional transportation request from an additional requestor mobile computing device and match the additional transportation request to an additional autonomous vehicle operated by an additional autonomous vehicle provider (e.g., a second autonomous vehicle operations server system). The autonomous vehicle synchronization system 102 can generate a third interface and a fourth interface and provide the third interface to the additional requestor mobile computing device and the fourth interface to the additional autonomous vehicle computing device via the second autonomous vehicle operations server system. In particular, the autonomous vehicle synchronization system 102 can utilize a second protocol, a second API, and/or a second level of control to display GUIs at the additional vehicle computing device via the second autonomous vehicle operations server system.

Notably, in some implementations, the autonomous vehicle synchronization system 102 utilizes the requestor mobile computing device 304, which is separate from the autonomous vehicle (e.g., belongs to a requestor). This allows the autonomous vehicle synchronization system 102 to synchronize a mobile device belonging to an individual with an autonomous vehicle computing device controlled by the third-party server(s) 108. Accordingly, the autonomous vehicle synchronization system 102 can provide a coordinated, synchronized experience for the requestor by utilizing the requestor's own device and the device controlled by the third-party server(s) 108 (and/or other autonomous vehicle operation server systems). This approach provides an added level of safety, synchronicity, and comfort to the operator of the requestor device, inasmuch as the requestor mobile device and the autonomous vehicle computing device provide synchronized information with the same look and feel.

Moreover, this approach provides continuity before, during, and after utilization of the autonomous vehicle. Indeed, the autonomous vehicle synchronization system 102 can receive a transportation request from the requestor mobile device, coordinate with the requestor mobile device prior to entering the autonomous vehicle (e.g., by providing a digital map and/or direction indicating matching information and a pickup location), coordinate via both the autonomous vehicle computing device and the requestor mobile device during the transportation service, and then seamlessly coordinate via the requestor mobile device after the transportation service concludes (e.g., providing user interfaces for rating the autonomous vehicle, payment options, and/or transportation summary information). This provides for continuous digital communication, improved synchronized information during the transportation request from multiple sources, and increased requestor familiarity during the entire user interface experience. Moreover, in some implementations, no matter what mobile device a requestor has (and regardless of the autonomous vehicle provider) the autonomous vehicle synchronization system 102 provides a seamless UI experience that is preserved in this synchronization.

Figure 4:
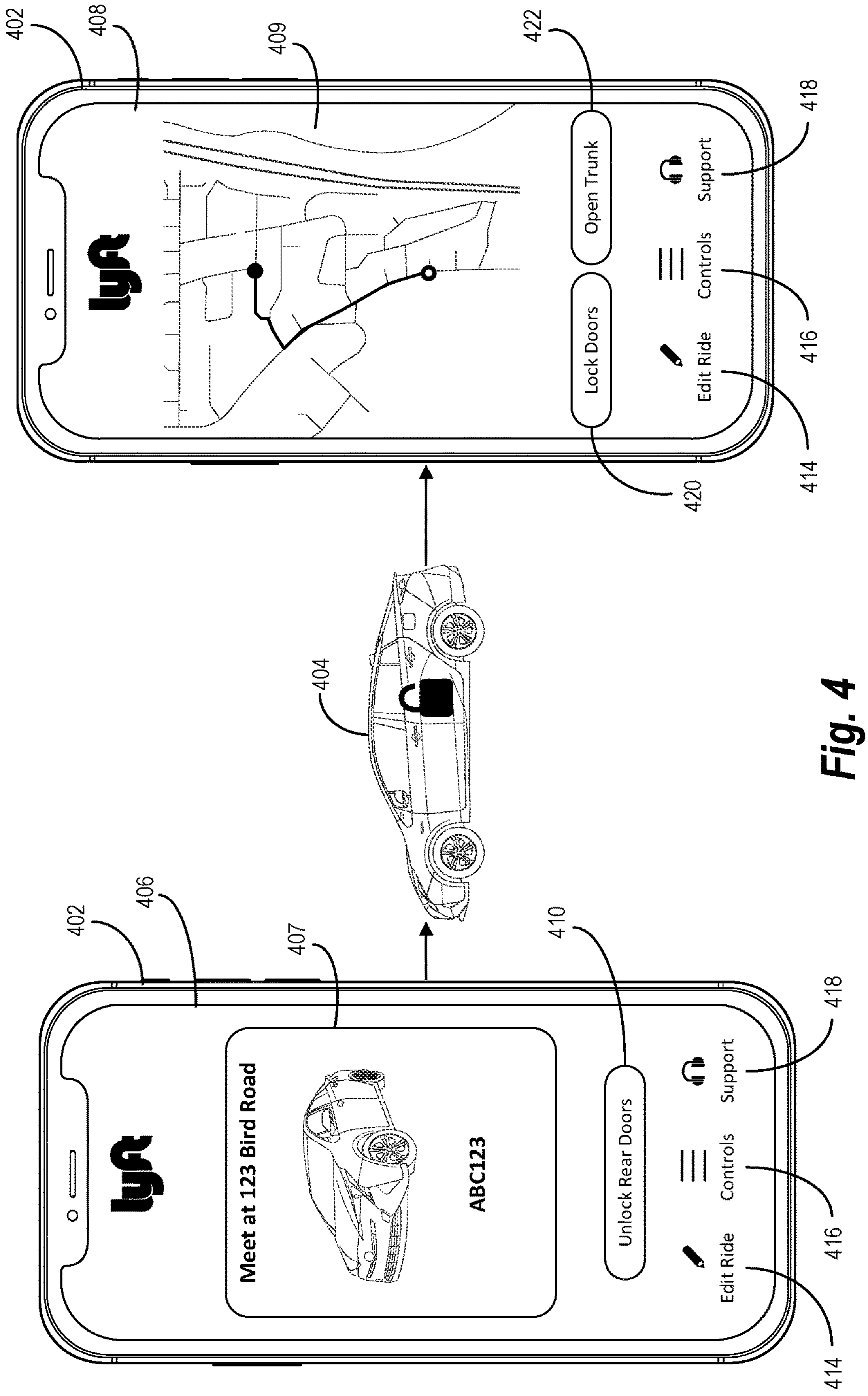
FIG. 4 illustrates an example graphical user interface for a requestor mobile computing device prior to commencing transportation services in accordance with one or more embodiments.

As previously discussed, the autonomous vehicle synchronization system 102 can generate one or more interfaces based on the ride state. FIG. 4 illustrates an example graphical user interface for a requestor mobile computing device prior to commencing the digital transportation request in accordance with one or more embodiments.

In particular, FIG. 4 includes the requestor mobile computing device 402 having a requestor mobile computing device interface 406 that includes elements, features, graphics, messages and/or options based on a pre-ride state. As shown in FIG. 4, the requestor mobile computing device interface 406 includes a ride status pane 407 that includes a pickup/meeting location (e.g., 123 Bird Road). As illustrated in FIG. 4, the requestor mobile computing device interface 406 also includes selectable elements that can modify aspects of the transportation request and/or autonomous vehicle 404 prior to a requestor entering the autonomous vehicle 404. For instance, the requestor mobile computing device interface 406 includes an edit ride element 414, controls element 416, and support element 418. In addition, the requestor mobile computing device interface 406 includes an unlock rear doors selectable element, which allows the requestor mobile computing device to unlock the rear doors of the autonomous vehicle 404 prior to the requestor entering the autonomous vehicle.

As further shown in FIG. 4, once the autonomous vehicle synchronization system 102 receives user input selecting the unlock rear doors element 410, the autonomous vehicle synchronization system 102 unlocks the rear doors of the autonomous vehicle 404 allowing the requestor to enter the autonomous vehicle 404. As further illustrated in FIG. 4 once the rear doors of the autonomous vehicle 404 unlock and the requestor enters the autonomous vehicle 404, the autonomous vehicle synchronization system 102 determines a different (e.g., updated) ride state and provides an updated requestor mobile computing device interface 408 based on the different ride state. For example, as shown in FIG. 4, the updated requestor mobile computing device interface 408 comprises an interactive map 409, edit ride element 414, controls element 416, support element 418, lock doors element 420, open trunk element 422. In some embodiments, the updated requestor mobile computing device interface 408 includes a start ride element.

As illustrated in FIG. 4, various interfaces based on different ride states may share selectable elements, features, graphics, messages, and/or options. For instance, the updated requestor mobile computing device interface 408 shares the edit ride element 414, controls element 416, and support element 418 with the requestor mobile computing device interface 406.

As discussed above, FIG. 3 illustrates a series of acts of the server(s) 106 housing the autonomous vehicle synchronization system 102 monitoring signals from the requestor mobile computing device and the autonomous vehicle computing device and determining a ride state based on the signals in accordance with one or more embodiments. To further illustrate the series of acts described with respect to FIG. 3, FIGS. 5A-5D include a set of corresponding graphical user interfaces. In particular, FIGS. 5A-5D show graphical user interfaces of the requestor mobile computing device and the autonomous vehicle computing device with respect to fulfilling a digital transportation request in accordance with one or more embodiments.

As shown, FIGS. 5A-5D include a requestor mobile computing device 502 and an autonomous vehicle computing device 504 (e.g., the requestor mobile computing device 112 and the autonomous vehicle computing device 114 described previously). FIGS. 5A-5D show how the autonomous vehicle synchronization system 102 (and/or the transportation matching system 104) can cause the graphical user interface on the requestor mobile computing device 502 and the requestor autonomous vehicle display 506 of the autonomous vehicle computing device 504 to update over time based on monitoring received signals from one or more of the devices.

Figure 5A:
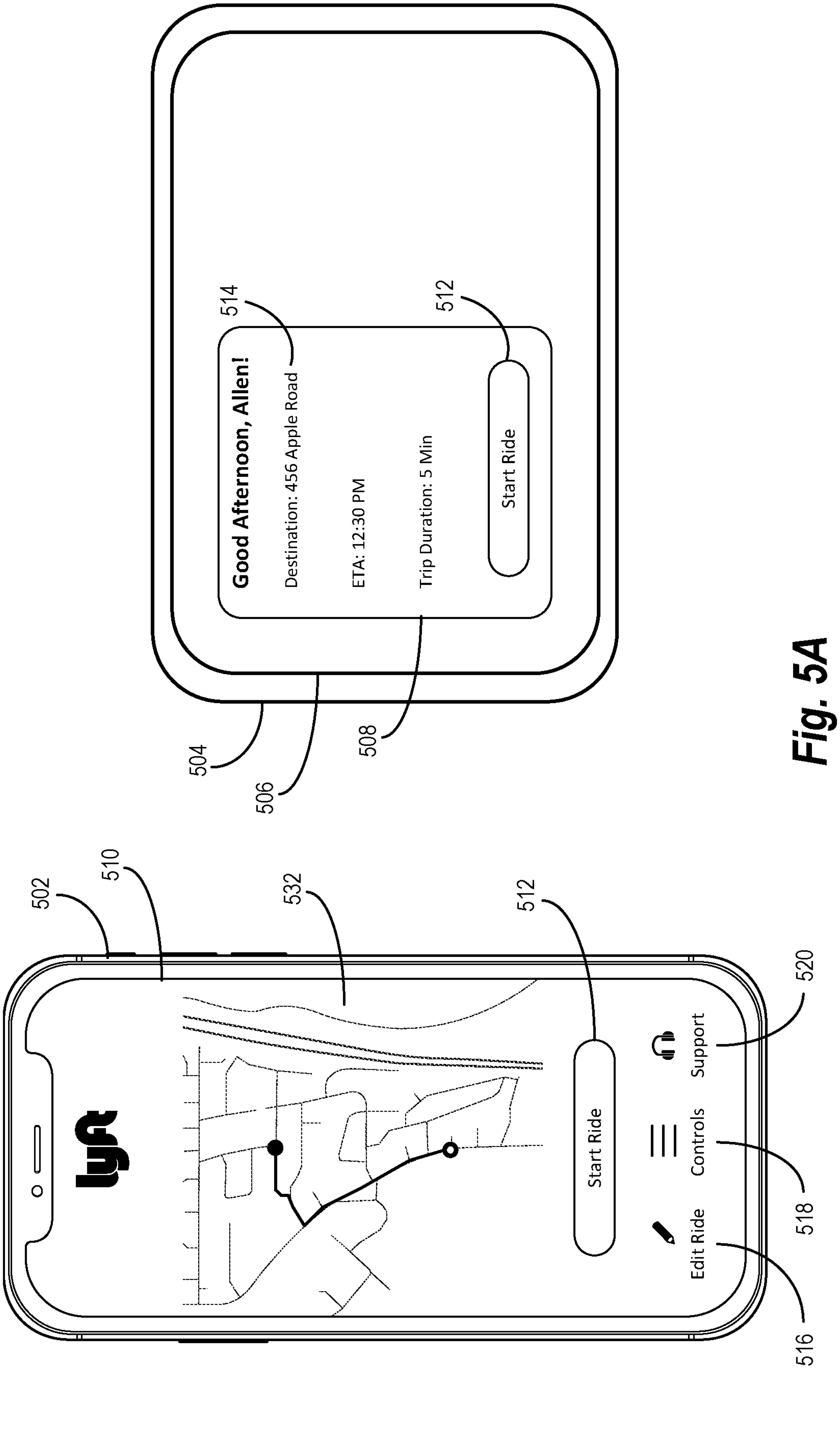
FIGS. 5A-5D illustrate example synchronized graphical user interfaces in accordance with one or more embodiments.

More specifically, FIG. 5A includes the requestor mobile computing device 502 displaying a first interface 510 and the requestor autonomous vehicle display 506 displaying a second interface based on a pre-ride state. In particular, FIG. 5A illustrates the first interface and the second interface comprising selectable elements, features, messages, graphics, notifications, and/or options based on the pre-ride state.

As shown in FIG. 5A, the first interface 510 comprises an interactive map 532, start ride element 512, edit ride element 516, controls element 518, and support element 520. The second interface comprises a ride status pane 514 and the start ride element 512. As discussed above, during the pre-ride state, the autonomous vehicle synchronization system 102 provides for display the first interface while synchronously providing the second interface. As mentioned above, the synchronous display of the first interface and the second interface effectively communicates information at critical junctions of the transportation service without requiring the requestor to navigate, scroll, and/or swipe through various windows to find information about the transportation request.

As further illustrated in FIG. 5A, the first interface includes the edit ride element 516. Based on detecting user selection of the edit ride element, the autonomous vehicle synchronization system 102 can update the first interface 510 and the second interface 508 to include a text input field that allows the requestor to enter a new drop-off location or an additional stop. In some embodiments, the autonomous vehicle synchronization system 102 provides for display on the second interface a list of popular locations and/or previously selected drop-off locations.

In some cases, upon detecting user selection of the controls element, the autonomous vehicle synchronization system 102 modifies the first interface and second to include a climate element, lighting element, media element, mood selectable element, and/or windows selectable element. In some embodiments, the second interface can also include music suggestions or a particular mode (e.g., comfort mode, relax mode, etc.). More detail regarding the controls element is given in regard to FIG. 8.

Moreover, in one or more implementations, the detection of a selection of the support element 520 updates the first interface 510 to include a message asking the requestor if they would like a call from customer support or a text input field for reporting issue issues. Additionally, the detection of the selection of the support element also causes the autonomous vehicle synchronization system 102 to synchronously update the second interface 508 to include a customer support call selectable element.

In some embodiments, the first interface 510 and second interface 508 include a safety tools element. Detecting selection of the safety tools element can update the first interface 510 and second interface 508 to include selectable elements that allows the requestor mobile computing device to share ride details (e.g., license plate number, care model, location, etc.), contact emergency personnel, and/or learn about safety features.

As further shown in FIG. 5A, the second interface 508 includes a ride status pane 514 that comprises a welcome message, information about the transportation request (e.g., drop-off location, the ETA, and trip duration), and the start ride element 512. In some embodiments, the ride status pane 514 includes additional information such as potential delays. In some embodiments, the second interface includes dynamic graphics and/or images. For instance, in one or more embodiments, next to the ride status pane, the second interface 508 includes an image of an autonomous vehicle pulling away. In certain embodiments, the second user interface can be paired with audio and/or visual cues. For example, while the autonomous vehicle synchronization system 102 provides for display the first and second interface, a voice over (via one or both devices) can welcome the requestor to the car, remind the requestor to fasten their seatbelt, keep the doors to the autonomous vehicle closed, and/or tell the requestor to start the ride by selecting the start ride element 512 on the first interface 510 or the second interface 508.

Figure 5B:
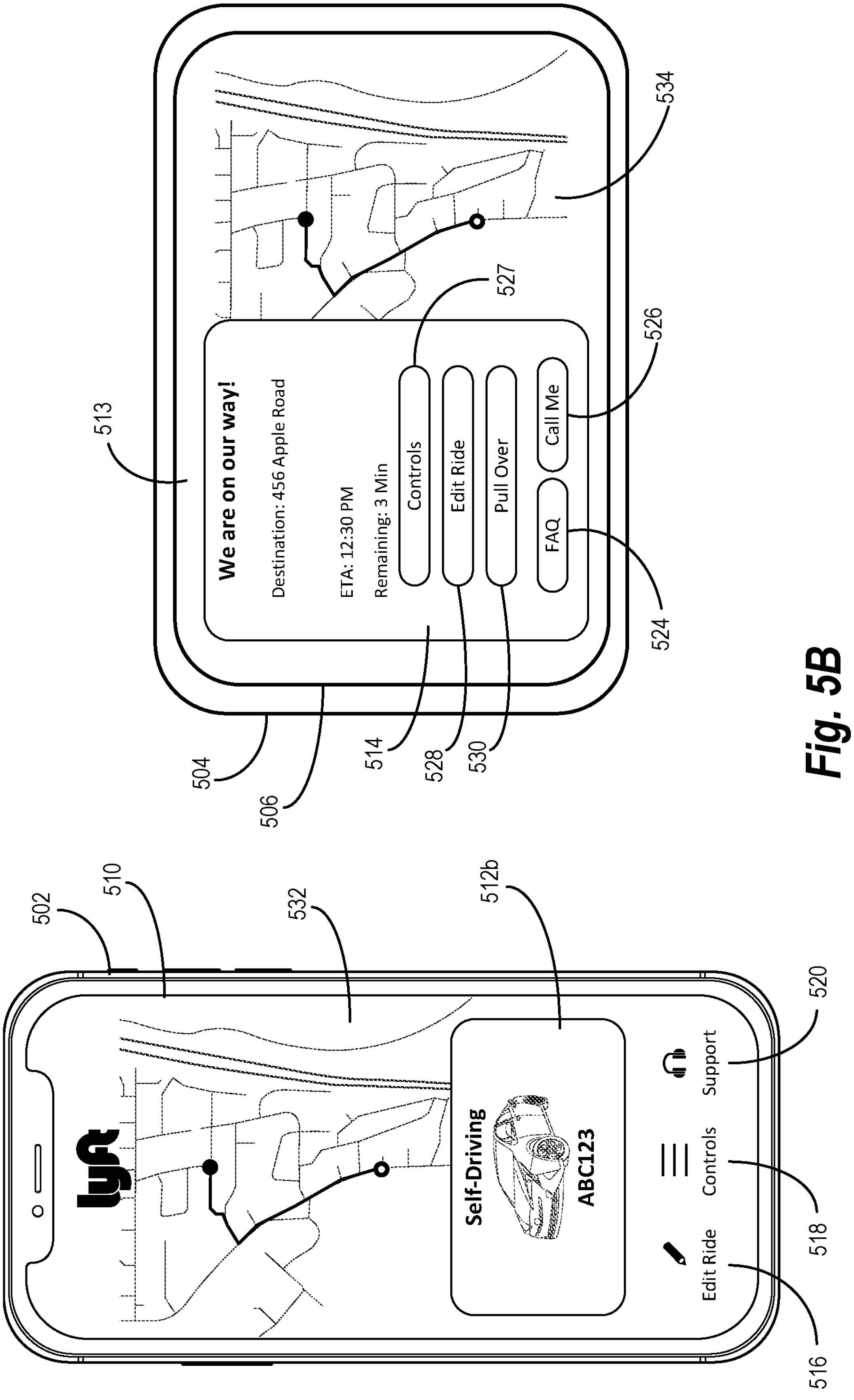

As mentioned above, the first interface and second interface can change based on a change in ride state. FIG. 5B illustrates the autonomous vehicle synchronization system 102 providing for synchronous display a third interface and a fourth interface based on a mid-ride state. To illustrate, once the autonomous vehicle synchronization system 102 receives a start ride signal from the requestor mobile computing device 502 and/or the autonomous vehicle computing device 504, the ride state changes to a mid-ride state, and the autonomous vehicle synchronization system 102 generates a third interface 511 for the requestor mobile computing device 502 and a fourth interface 513 on the requestor autonomous vehicle display 506 of the autonomous vehicle computing device 504.

As shown in FIG. 5B, the third interface 511 comprises an additional ride status pane 522, edit ride element 516, controls element 518, support element 520, and an interactive map 532. As discussed in reference to FIG. 5A, detection of interaction with the start ride element 512, controls element 518, support element 520 causes the autonomous vehicle synchronization system 102 to update the third interface 511 and fourth interface 513 with additional selectable elements, messages, notifications, and/or options related to the transportation service.

As further shown in FIG. 5B, the autonomous vehicle synchronization system 102 synchronously displays the third interface 511 and the fourth interface 513. In some embodiments, the fourth interface comprises the ride status pane 514 with selectable elements, messages, notifications and options that differ from the second interface 508. For instance, the fourth interface includes FAQ element 524, communication element 526 (e.g., call me), controls element 527, edit ride element 528, a pull over element 530 and the interactive map 532.

As discussed above, in some embodiments, detecting a selection of one of one or more of the selectable elements on the third interface 511 or fourth interface 513 updates the third interface 511 and fourth interface 513. For example, based on detecting a selection of the pull over element 530, an interactive panel appears on the fourth interface 513 that includes additional selectable elements, messages, notifications, and/or options related to pulling over the autonomous vehicle at a location that differs from the initial drop-off location. For instance, the interactive panel on the fourth interface 513 may include a pull over confirmation elements (e.g., yes, ready to pull over, or no, not ready to pull over), a list of next available pull over locations, and/or popular pull over locations in the area. In some cases, the autonomous vehicle synchronization system 102 updates the third interface 511 with similar options that complement the fourth interface 513 (e.g., displaying a pulling over message).

While not shown in FIG. 5B, in some embodiments, the third interface 511 and the fourth interface 513 include additional elements, messages, and/or notifications. For instance, the third interface 511 and the fourth interface 513 may include shared selectable elements comprising a security tools selectable element, end ride selectable element, and/or relaxation mode element. Moreover, the third interface 511 and the fourth interface 513 may include any combination of the previously described elements, notifications, and/or options.

Figure 5C:
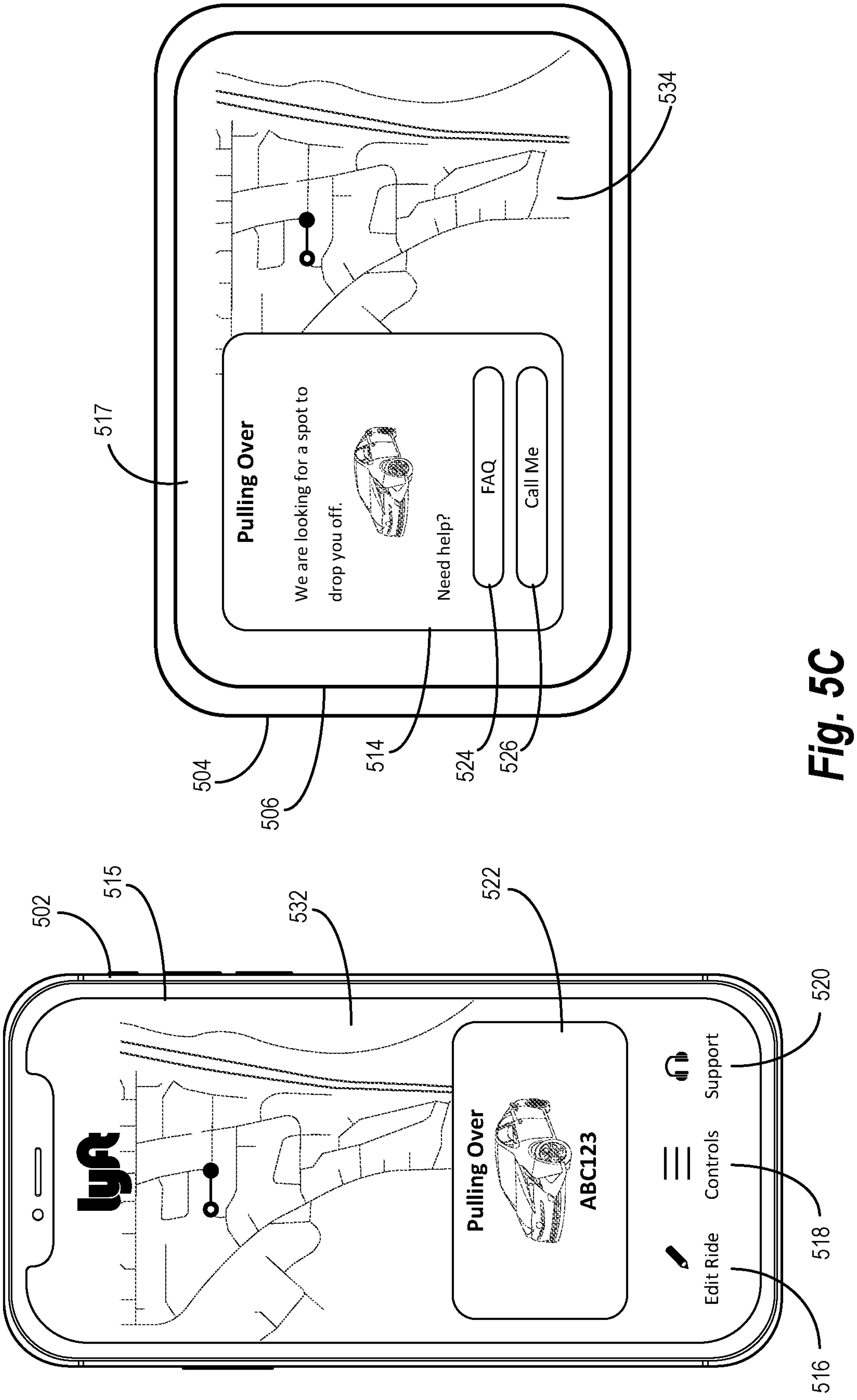

As previously discussed, the autonomous vehicle synchronization system 102 generates an interface for the requestor mobile computing device 502 and the autonomous vehicle computing device 504 based on the ride state. FIG. 5C illustrates a fifth interface and a sixth interface based on a pulling-over state. More detail regarding the autonomous vehicle synchronization system 102 determining the pulling-over state is given in regard to FIG. 7A. In one or more embodiments, based on the pulling-over state, the autonomous vehicle synchronization system 102 generates the fifth interface 515, the sixth interface 517, and synchronously surfaces the fifth interface 515 on the requestor mobile computing device 502 and sixth interface 517 on the requestor autonomous vehicle display 506 of the autonomous vehicle computing device 504.

As shown in FIG. 5C the fifth interface 515 includes the edit ride element 516, controls element 518, support element 520, the additional ride status pane 522, and the interactive map 532. As shown in FIG. 5C the additional ride status pane 522 can also comprise messages and/or notifications about the status of the transportation service. For instance, the additional ride status pane 522 can indicate that the autonomous vehicle is pulling over.

As further shown in FIG. 5C the sixth interface 517 comprises the ride status pane 514, FAQ element 524, communication element 526 (e.g., call me), and interactive map 534. Like the additional ride status pane 522, the ride status pane 514 can include complementary messages indicating that the autonomous vehicle is pulling over and trying to find a drop off location. In some embodiments, the ride status pane 514 can include a stay in car notification while the autonomous vehicle pulls over. In one or more embodiments, the autonomous vehicle synchronization system 102 pairs audio and/or visual cues with the interfaces. For example, the autonomous vehicle synchronization system 102 broadcasts (via one or both devices) a stay-in-car audio message or a pulling over audio message during a pulling-over state. As discussed above, in some implementations, detected interaction with the selectable elements on the fifth interface 515 and/or the sixth interface 517 causes the autonomous vehicle synchronization system 102 to update the fifth interface 515 and the sixth interface 517 with interactive panels associated with the selectable element.

Figure 5D:
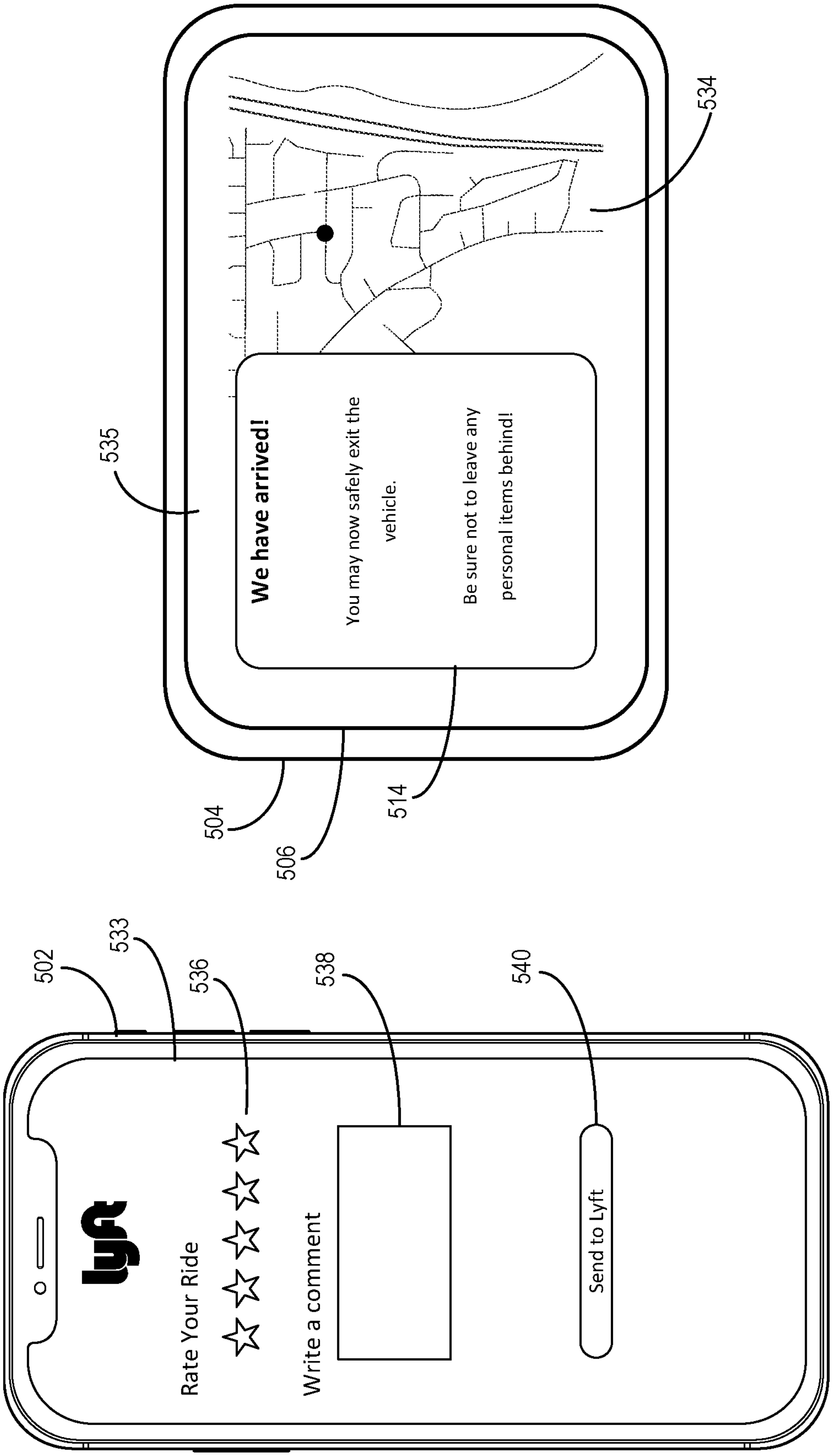

As mentioned above, in some embodiments, the autonomous vehicle synchronization system 102 determines an arrival state. FIG. 5D includes the requestor mobile computing device 502 and the autonomous vehicle computing device 504, where the autonomous vehicle synchronization system 102 generates a seventh interface 533 and an eighth interface 535 based on the arrival state. In particular, the autonomous vehicle synchronization system 102 generates and surfaces the seventh interface 533 via the requestor mobile computing device 502 while synchronously surfacing the eighth interface 535 via the requestor autonomous vehicle display 506 of the autonomous vehicle computing device 504.

As shown in FIG. 5D, the seventh interface can include a rate your ride element 536, a write a comment text input field 538, and a send to Lyft element 540. While the autonomous vehicle synchronization system 102 surfaces the seventh interface 533, the autonomous vehicle synchronization system 102 also surfaces the eighth interface 535. As shown in FIG. 5D, the eighth interface 535 comprises the ride status pane 514 with an arrival notification indicating that it is safe to exit the autonomous vehicle and the interactive map 534 indicating the drop-off location. In some implementations, the ride status pane 514 includes reminder messages. For example, if the requestor accessed the trunk of the autonomous vehicle, the ride status pane 514 may include a reminder to check the trunk. In some embodiments, the eighth interface 535 includes the rate your ride element 536, a write a comment text input field 538, and a send to Lyft element 540. Likewise, in certain embodiments, the seventh interface 533 includes an arrival notification and/or reminder messages. In some implementations, the seventh interface 533 and the eighth interface 535 both include an arrival notification indicating that it is safe to exit and/or a reminder to check the trunk.

Figure 6:
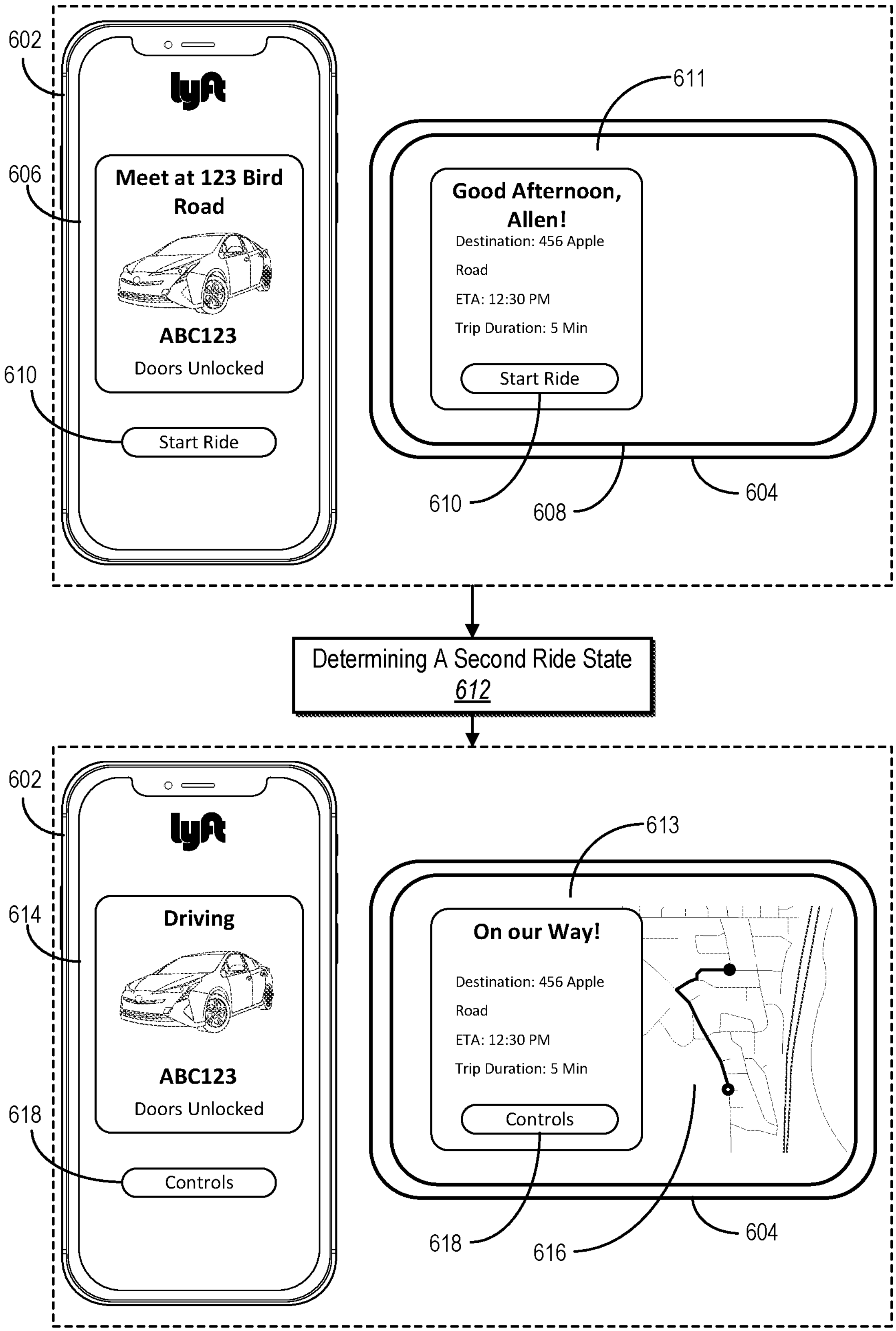
FIG. 6 illustrates the autonomous vehicle synchronization system synchronously updating a first interface and second interface based on determining a new ride state in accordance with one or more embodiments.

As previously mentioned, the autonomous vehicle synchronization system 102 can determine a change in the ride state. To illustrate, FIG. 6 shows the autonomous vehicle synchronization system 102 synchronously updating a first interface 606 and a second interface 611 based on determining a new ride state in accordance with one or more embodiments. In particular, FIG. 6 shows the autonomous vehicle synchronization system 102 updating the first interface 606 and the second interface based on performing the act 612 of determining a second. As previously discussed, the autonomous vehicle synchronization system 102 associates the ride state with one or more conditions and the fulfillment of the one or more conditions triggers a ride state change.

As shown in FIG. 6, the transportation service is in a pre-ride state. As previously discussed, based on the pre-ride state, the first interface 606 and the second interface 611 share a start ride element 610. As mentioned above, in some embodiments, the autonomous vehicle synchronization system 102 generates multiple interfaces that share selectable elements based on the ride state. Moreover, as discussed above, detection of a selection of the start ride element 610 via the first interface 606 or the second interface 611 sends a start ride signal to the autonomous vehicle synchronization system 102. Based on the start ride signal, the autonomous vehicle synchronization system 102 recognizes a change in conditions regarding the transportation service and can determine a new ride state.

As shown in FIG. 6, the autonomous vehicle synchronization system 102 performs the act 612 of determining a second ride state. In particular, detecting a selection of the start ride element 610 causes the autonomous vehicle to navigate towards the drop-off location. Due to the change in conditions (e.g., the autonomous vehicle driving to the drop-off location), the autonomous vehicle synchronization system 102 can determine whether the change in conditions triggers a different/subsequent ride state. As shown in FIG. 6, the autonomous vehicle synchronization system 102 determines that the second ride state corresponds to a mid-ride state. In some embodiments, the conditions related to the mid-ride state include receiving a start ride signal based on detecting a selection of the start ride element 610. In alternative embodiments, after detecting fastened seatbelts and waiting at the pickup location for a defined period of time (e.g., three minutes), the autonomous vehicle computing device starts navigating towards the drop-off location. In such embodiments, the autonomous vehicle computing device 604 and/or the third-party server sends a start driving signal to the autonomous vehicle synchronization system 102. In some embodiments, the autonomous vehicle computing device 604 or the requestor mobile computing device 602 receives a verbal cue requesting commencement of the transportation request and sends the start ride signal to the autonomous vehicle synchronization system 102.

As shown in FIG. 6, once the autonomous vehicle synchronization system 102 performs the act 612 of determining the second ride state, the autonomous vehicle synchronization system 102 generates new interfaces to synchronously surface to the requestor mobile computing device 602 and requestor autonomous vehicle display 608 of the autonomous vehicle computing device 604 based on the second ride state. As shown in FIG. 6, the second ride state corresponds to the mid-ride state. As discussed above, based on the mid-ride state the autonomous vehicle synchronization system 102 generates and concurrently surfaces a third interface 614 and a fourth interface 613. As shown in FIG. 6, the third interface 614 comprises a shared controls element 618 and the fourth interface comprises the shared controls element 618 and an interactive map 616.

FIG. 6 shows the autonomous vehicle synchronization system 102 labelling the ride states sequentially (e.g., the pre-ride state as the first ride state and the mid-ride state as the second ride state). However, in alternative embodiments, the autonomous vehicle synchronization system 102 does not sequentially label the ride states.

Figure 7A:
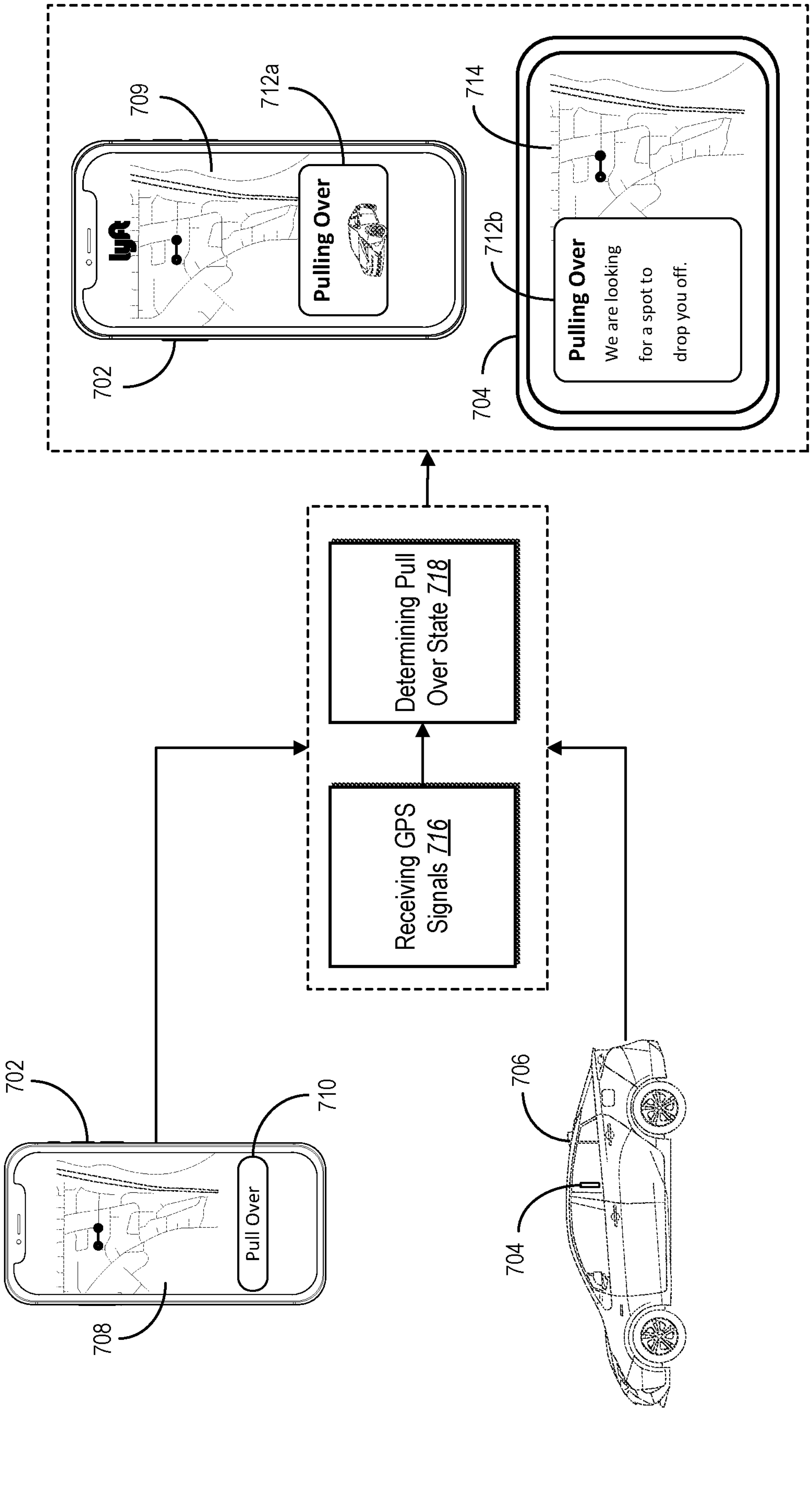
FIGS. 7A-7B illustrate the autonomous vehicle synchronization system determining a pulling-over state and arrival ride state and, based on the ride state, displaying synchronous interfaces across various devices.
Figure 7B:
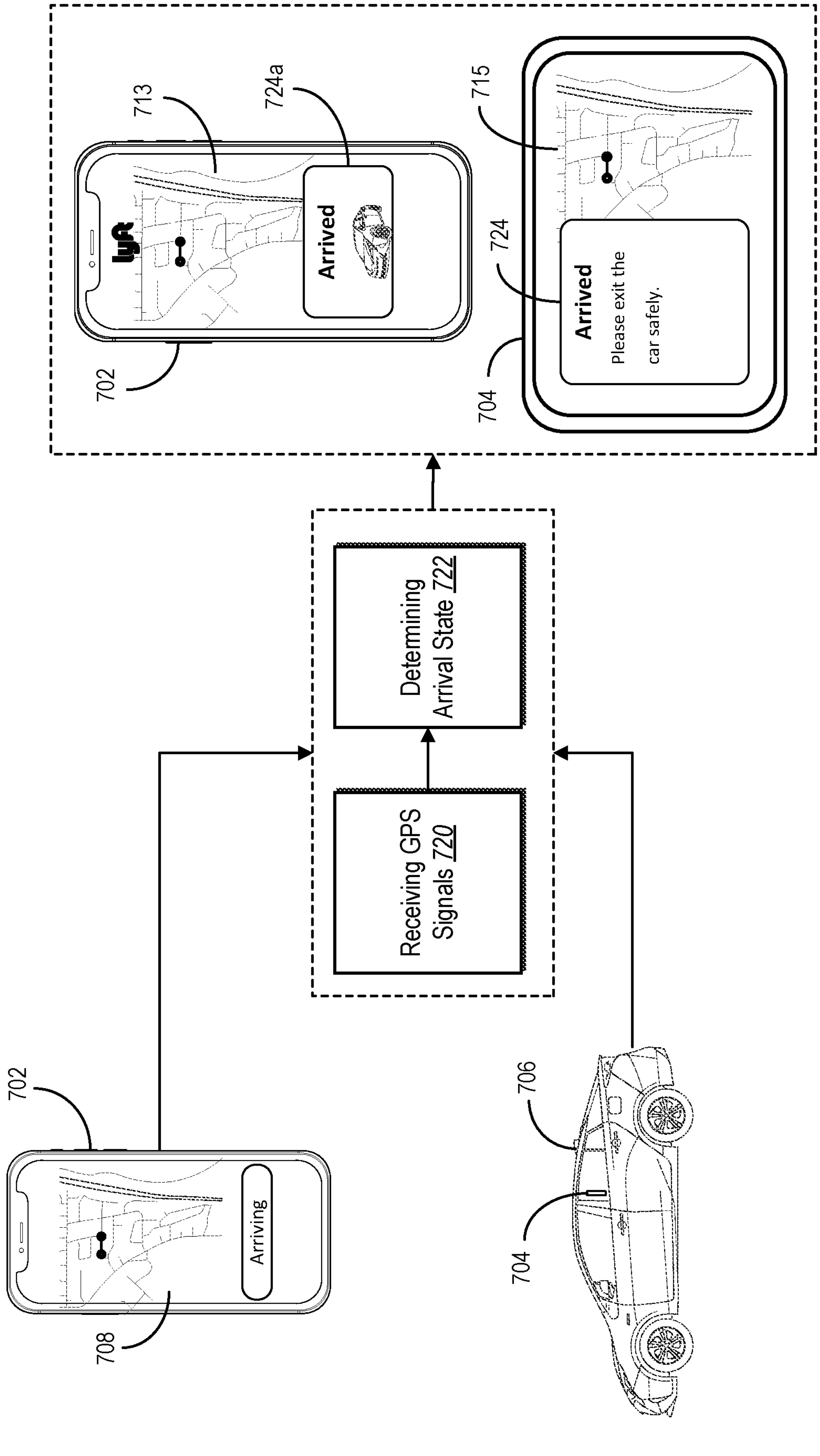

FIG. 6 illustrates the autonomous vehicle synchronization system 102 performs the act 612 of determining a second ride state and surfacing various interfaces across multiple devices based on the second ride state. FIGS. 7A-7B illustrate the autonomous vehicle synchronization system determining a pulling-over state and arrival ride state and displaying synchronous interfaces across various devices based on the pulling-over state and the arrival state.

As discussed above, the autonomous vehicle synchronization system 102 determines a ride state based on signals of a requestor mobile computing device and/or signals of an autonomous vehicle computing device of an autonomous vehicle. FIGS. 7A-7B illustrate the autonomous vehicle synchronization system 102 receiving signals from the requestor mobile computing device 702 and/or signals of an autonomous vehicle computing device 704 of an autonomous vehicle 706 and determining a pulling-over state and an arrival state based on those signals in accordance with one or more embodiments.

As shown in FIG. 7A, the autonomous vehicle synchronization system 102 receives signals from the requestor mobile computing device 702 and/or the autonomous vehicle computing device 704 of the autonomous vehicle 706. In certain embodiments, the autonomous vehicle synchronization system 102 monitors GPS signals from the requestor mobile computing device 702 and/or the autonomous vehicle computing device 704. As shown in FIG. 7A, the autonomous vehicle synchronization system 102 performs the act 716 of receiving GPS signals. In particular, the GPS signals can indicate how close the requestor mobile computing device 702 and/or the autonomous vehicle computing device 704 is to the drop-off location.

In alternative embodiments, the autonomous vehicle synchronization system 102 does not receive GPS signals from the autonomous vehicle computing device 704 and instead receives (e.g., pulls) signals regarding the status of the autonomous vehicle from the third-party server(s) associated with the autonomous vehicle computing device 704. For example, the third-party server(s) can send a pull-over signal to the autonomous vehicle synchronization system 102 while the autonomous vehicle 706 pulls over.

In some implementations, the autonomous vehicle synchronization system 102 receives a pull over signal based on detecting user interaction with the third interface 708 of the requestor mobile computing device. As illustrated in FIG. 7A, the third interface 708 of the requestor mobile computing device 702 includes a pull over element 710. Based on the requestor mobile computing device receiving a selection of the pull over element 710, the autonomous vehicle synchronization system 102 receives the pull over signal from the requestor mobile computing device 702.

As previously discussed, ride states correspond to one or more defined conditions. In some implementations, based on the received signals, the autonomous vehicle synchronization system 102 can determine the fulfillment of the conditions corresponding to the ride state. In particular, based on the existence of one or more conditions, the autonomous vehicle synchronization system 102 changes/updates the ride state. As shown in FIG. 7A, the autonomous vehicle synchronization system 102 performs the act 718 of determining a pulling-over state. As illustrated in FIG. 7A, the pulling-over state occurs when the autonomous vehicle synchronization system 102 receives GPS signals from the requestor mobile computing device and/or the autonomous vehicle computing device 704. In particular, the autonomous vehicle synchronization system 102 can determine the pulling-over state based on the received GPS signals indicating that the requestor mobile computing device 702 and/or autonomous vehicle computing device 704 is within a threshold distance from the drop-off location. In alternative embodiments, the autonomous vehicle synchronization system 102 can determine the pulling-over state based on the received GPS signals of the requestor mobile computing device and/or the autonomous vehicle computing device 704 indicating that the autonomous vehicle 706 is within a threshold time from the ETA. For example, the autonomous vehicle synchronization system 102 can determine a pulling-over state based on the autonomous vehicle 706 being one minute away from the drop-off location, In alternative embodiments, the autonomous vehicle synchronization system 102 does not receive GPS signals from the autonomous vehicle computing device 704. In such embodiments, the autonomous vehicle synchronization system 102 can determine the pulling-over state based on anticipating the arrival of the autonomous vehicle 706 to the drop-off location. For example, based on the ETA and the remaining duration of the transportation service, the autonomous vehicle synchronization system 102 can estimate when the autonomous vehicle 706 is within a threshold distance or period of time from the drop-off location.

Additionally, in one or more embodiments, the autonomous vehicle synchronization system 102 determines the pulling-over state based on receiving a pull-over signal from the requestor mobile computing device 702, the autonomous vehicle computing device 704, or the third-party server(s) as discussed above.

As previous discussed, and further shown in FIG. 7A, the autonomous vehicle synchronization system 102 generates multiple interfaces based on the ride state. In particular, FIG. 7A shows the autonomous vehicle synchronization system 102 generating a fifth interface 709 and a sixth interface 714 based on the pulling-over state. In particular, FIG. 7A illustrates the autonomous vehicle synchronization system 102 synchronously surfacing the fifth interface 709 via the requestor mobile computing device 702 and the sixth interface 714 via the requestor autonomous vehicle display of the autonomous vehicle computing device 704. As shown in FIG. 7A, the fifth interface includes pull over notifications 712*a-b*. As discussed above, the fifth interface 709 and sixth interface 714 can include a stay-in-car notification and or reminder messages. In one or more embodiments, autonomous vehicle synchronization system 102 can broadcast audio and or visual cues corresponding to the ride state.

As previously discussed, the autonomous vehicle synchronization system 102 determines the ride state based on monitoring signals of a requestor mobile computing device and/or signals of an autonomous vehicle computing device. FIG. 7B illustrates the autonomous vehicle synchronization system 102 performing the act 720 of receiving GPS signals, determining an arrival state based on receiving the GPS signals, and synchronously surfacing a seventh interface 713 to the requestor mobile computing device and eighth interface 715 to the requestor autonomous vehicle display of the autonomous vehicle computing device 704. As discussed in FIG. 7A, in some cases, the autonomous vehicle synchronization system 102 receives GPS signals from the requestor mobile computing device 702, autonomous vehicle computing device 704, and/or third-party server(s) associated with the autonomous vehicle computing device 704. For example, the autonomous vehicle synchronization system 102 receives GPS signals indicating the arrival of the requestor mobile computing device 702 and/or autonomous vehicle computing device 704 at the drop-off location. In alternative embodiments, the autonomous vehicle synchronization system 102 does not access GPS signals of the autonomous vehicle computing device 704. In such embodiments, the autonomous vehicle synchronization system 102 can receive an arrival signal from the third-party server(s) and/or autonomous vehicle computing device 704 indicating the completion of the transportation service. For example, in some implementations, the third-party server(s) sends an arrival signal to the autonomous vehicle synchronization system 102 indicating the termination of the transportation service.

As further illustrated in FIG. 7B, the autonomous vehicle synchronization system 102 performs the act 722 of determining an arrival state. As discussed above, ride states correspond to one or more defined conditions. In some embodiments, the autonomous vehicle synchronization system 102 determines the arrival state based on GPS signals of the requestor mobile computing device 702, the autonomous vehicle computing device 704, and/or third-party server(s). For example, the autonomous vehicle synchronization system 102 determines an arrival state based on GPS signals of the requestor mobile computing device 702 indicating that the location of the requestor mobile computing device 702 matches the drop-off location. In alternative embodiments, the autonomous vehicle synchronization system 102 determines the arrival state based on receiving an arrival signal from the autonomous vehicle computing device 704 and/or third-party server. As discussed above, the autonomous vehicle synchronization system 102 can anticipate/predict the arrival of the autonomous vehicle 706 to the drop-off location. In such embodiments, based on the prediction of arrival, the autonomous vehicle synchronization system 102 can determine the arrival state.

As further illustrated in FIG. 7B, based on the arrival state, the autonomous vehicle synchronization system 102 can generate the seventh interface 713 and the eighth interface 715. As shown in FIG. 7, the autonomous vehicle synchronization system 102 synchronously surfaces the seventh interface 713 via the requestor mobile computing device 702 and the eighth interface 715 via the requestor autonomous vehicle display of the autonomous vehicle computing device 704. In some embodiments, the seventh interface 713 and the eighth interface 715 include an arrival notification 724. In one or more implementations, the autonomous vehicle synchronization system 102 pairs audio or visual cues with the arrival notification 724. For example, once the transportation service ends, the autonomous vehicle synchronization system 102 can broadcast an audio message indicating that it is safe to exit the vehicle. As discussed above, the seventh interface 713 and eighth interface 715 can include other elements, notifications, messages, and/or options.

Figure 8:
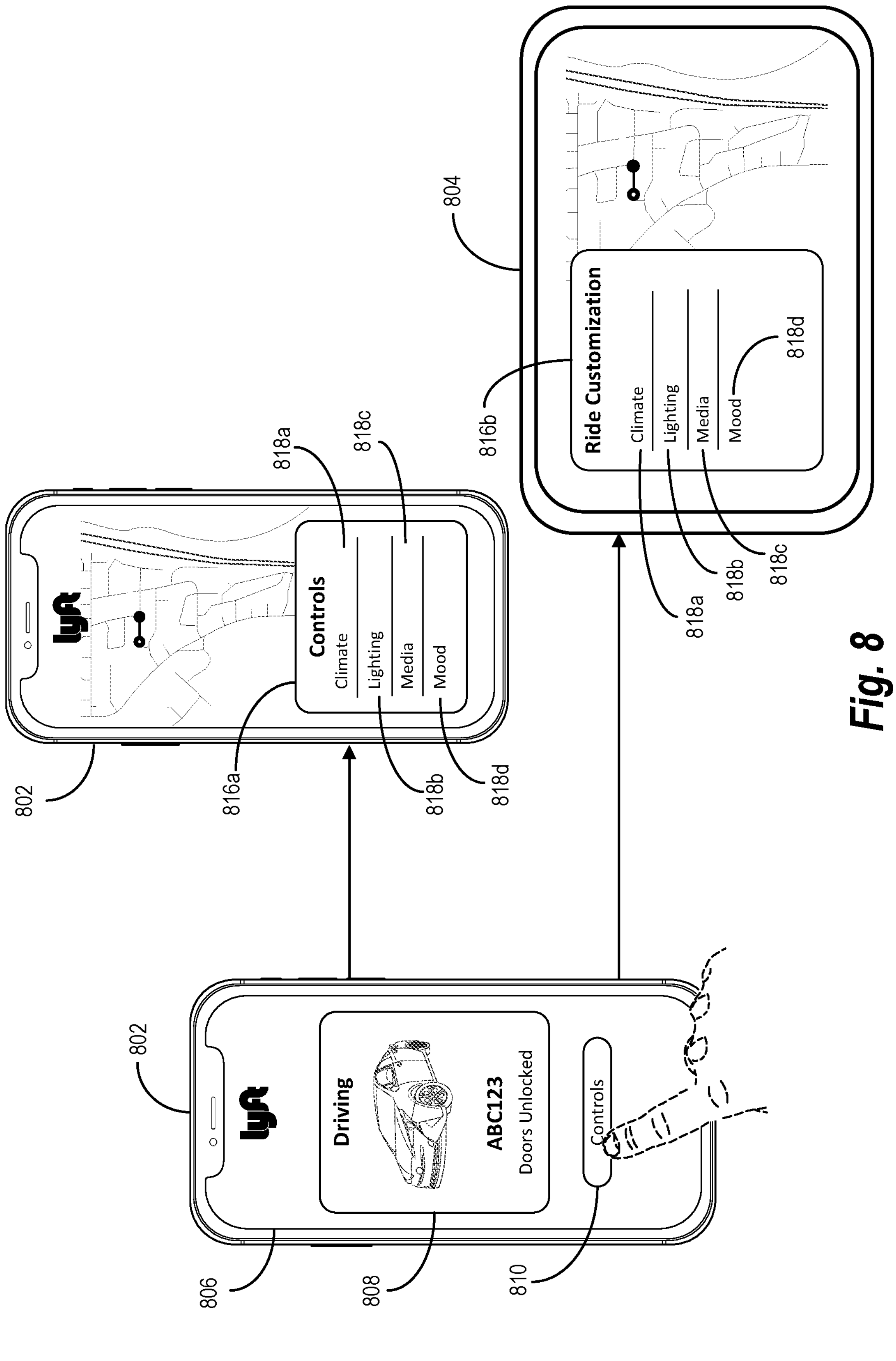
FIG. 8 illustrates the autonomous vehicle synchronization system providing for synchronous display a controls element and, in response to detecting interaction with the controls element, modifying a plurality of vehicle settings in accordance with one or more embodiments.

As discussed above, detecting interaction with one or more selectable elements via the interface of the requestor mobile computing device or autonomous vehicle computing device causes the autonomous vehicle synchronization system 102 to update multiple interfaces. FIG. 8 illustrates the autonomous vehicle synchronization system providing a controls element and in response to detecting interaction with a mode selectable element, modifying a plurality of vehicle settings in accordance with one or more embodiments.

As previously discussed, in some embodiments, the interface of the requestor mobile computing device and the autonomous vehicle computing device during the pre-ride state and the mid-ride state, includes a controls element. As mentioned above, detection of a selection of the controls element causes the interface of the requestor mobile computing device and/or the requestor autonomous vehicle display to surface additional elements that adjust conditions in the cabin of the autonomous vehicle.

As illustrated in FIG. 8, the first interface 806 of the requestor mobile computing device 802 includes a ride status pane 808 and a controls element 810. As illustrated in FIG. 8 receiving an interaction corresponding to the digital transportation request via the first interface by detecting a selection of the controls element 810 causes the autonomous vehicle synchronization system 102 to open an interactive pane 816*a* on the requestor mobile computing device 802 and an interactive pane 816*b* on the autonomous vehicle computing device 804. As illustrated, the interactive panes 816*a* and 816*b* include a climate element 818*a*, lighting element 818*b*, media element 818*c*, and mode selectable element 818*d*. In one or more embodiments, in response to receiving an additional interaction corresponding to the digital transportation request via the second interface by receiving an indication of a selection of the climate element on the second interface, the autonomous vehicle synchronization system 102 surfaces an additional interactive pane on the requestor mobile computing device 802 and the autonomous vehicle computing device 804 where the autonomous vehicle synchronization system 102 can receive adjustments to the temperature, fan speed, and or heated seats temperature.

Relatedly, as illustrated in FIG. 8, in response to detection a selection of the lighting element, the autonomous vehicle synchronization system 102 displays a corresponding interactive lighting panel where the autonomous vehicle synchronization system 102 can receive modifications to the lighting in the autonomous vehicle. For example, the autonomous vehicle synchronization system 102 can provide interactive elements (e.g., dials, sliders, etc.) that turn on, turn off, or adjust the brightness of the lights.

Additionally, as shown in FIG. 8, in response to the receiving an indication of an interaction with the media element, the autonomous vehicle synchronization system 102 displays an interactive media pane on the requestor mobile computing device 802 and the autonomous vehicle computing device 804 comprising an adjustable volume element, music selection element, podcast element, and/or streaming video element. For example, based on receiving a selection of the music selection element, the autonomous vehicle synchronization system 102 can provide for display suggested music, one or more music streaming services, and/or previously played content.

As further shown in FIG. 8, the interactive panes 816*a* and 816*b* include a mode selectable element. In some cases, detecting a selection of the mode selectable element causes the autonomous vehicle synchronization system 102 to modify a plurality of vehicle settings. In particular, in one or more cases, modifying the plurality of vehicle settings includes modifying at least two of: the vehicle's lighting, media content, volume, or climate. For instance, the mode selectable element can correspond to a relaxation mode. During the relaxation mode, the autonomous vehicle synchronization system 102 can dim the lights, play nature sounds, and lower the volume to create relaxed environment. In some embodiments, the relaxation mode can include reclining car seats or activating a seat warmer. In some embodiments, based on prior adjustments and settings associated with the requestor mobile computing device 802 the autonomous vehicle synchronization system 102 can personalize the relaxation mode.

As just mentioned, the autonomous vehicle synchronization system 102 can personalize the relaxation mode for a user. Relatedly, in some implementations, the autonomous vehicle synchronization system 102 can track the preferences of the requestor mobile computing device 802 and adjust the cabin of the autonomous vehicle according to the preference of the requestor mobile computing device 802 prior to arriving at the pickup location. Alternatively, in one or more embodiments, the autonomous vehicle synchronization system 102 can receive cabin condition presets defined by the requestor mobile computing device 802 and implement those presets before arriving at the pickup location.

FIGS. 1-8, the corresponding text, and the examples provide a number of different systems, methods, and non-transitory computer-readable media for providing a first interface and a second interface for synchronous display based on a ride state within a transportation matching system 104. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
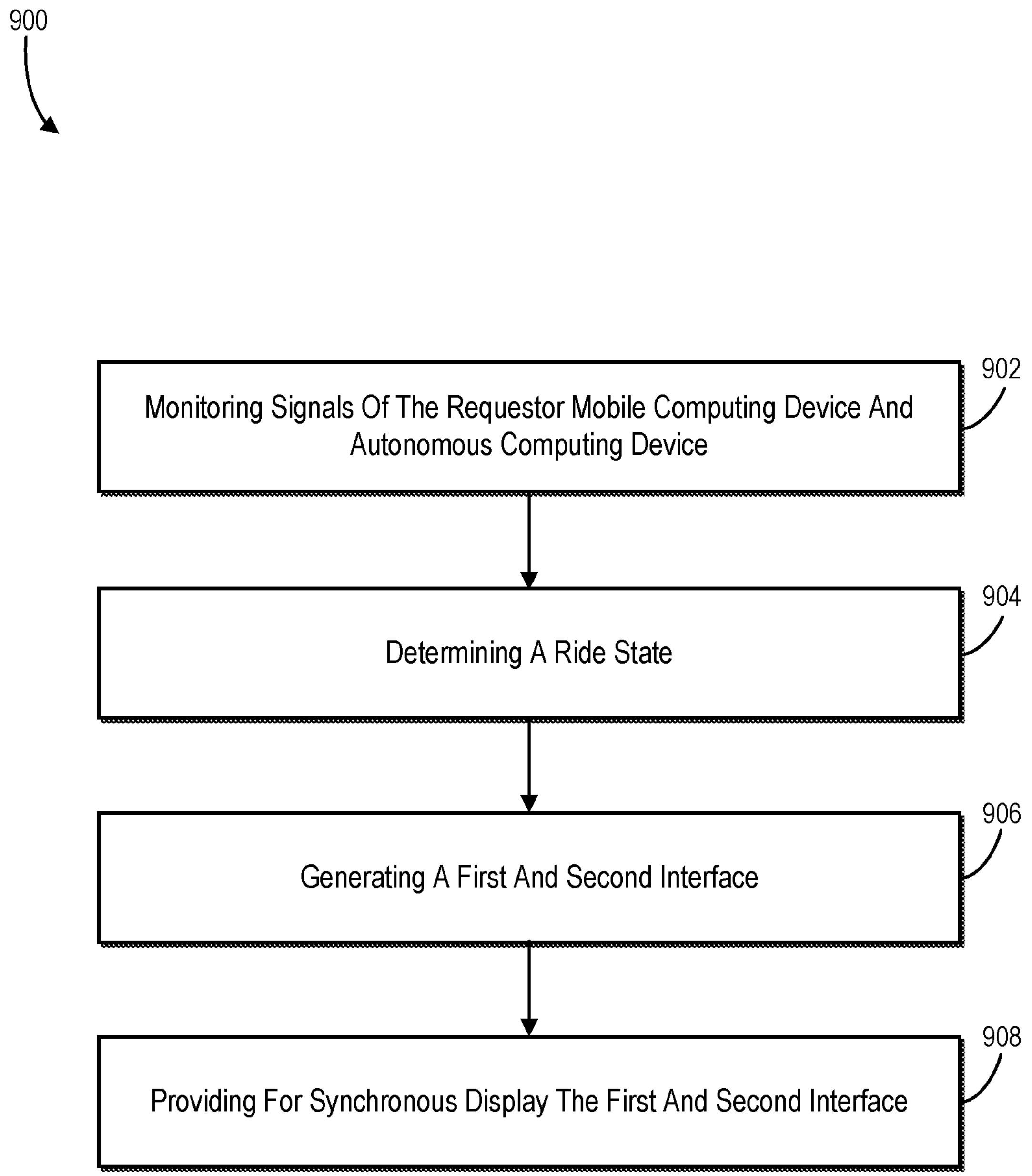
FIG. 9 illustrates a flowchart of a series of acts in a method of providing a first and second interfaces for synchronous display in accordance with one or more embodiments.

For example, FIG. 9 illustrates a flowchart of an exemplary sequence of acts 900 for providing a first and second interfaces for synchronous display. In addition, FIG. 9 may be performed with more or fewer acts. Further, the acts may be performed in differing orders. Additionally, the acts described herein may be repeated or performed in parallel with one another or parallel with different instances of the same or similar acts.

While FIG. 9 illustrates the series of acts 900 according to particular embodiments, alternative embodiments may omit, add to, reorder, and/or modify any of the acts shown. The series of acts 900 can be performed as part of a method. Alternatively, a non-transitory computer-readable medium can comprise instructions, when executed by one or more processors, cause a computing device (e.g., a requestor mobile computing device and/or a server device) to perform the series of acts of 900. In still further embodiments, a system performs the series of acts of 900.

As shown, the series of acts 900 can include an act 902 of monitoring signals of a requestor mobile computing device and an autonomous vehicle computing device. For example, the act 902 can involve in response to receiving a digital transportation request from a requestor mobile computing device corresponding to a requestor, monitoring signals of the requestor mobile computing device and signals of an autonomous vehicle computing device comprising a requestor autonomous vehicle display. In some implementations, the act 902 can include receiving a digital transportation request from a requestor mobile computing device corresponding to a requestor; selecting, from a plurality of autonomous vehicle providers, an autonomous vehicle corresponding to an autonomous vehicle provider for responding to the digital transportation request; and monitoring signals of the requestor mobile computing device and signals of an autonomous vehicle computing device of the autonomous vehicle corresponding to the autonomous vehicle provider, the autonomous vehicle computing device comprising a requestor autonomous vehicle display.

As shown, the series of acts 900 can include an act 904 of determining a ride state. For example, the act 904 can include determining a ride state based on the signals of the requestor mobile computing device and the signals of the autonomous vehicle computing device.

In one or more implementations the series of acts 900 can include an act 906 of generating a first and a second interface. In particular the act 906 can include generating a first interface and a second interface based on the ride state.

As further illustrated, the series of acts 900 can include an act 908 of providing for synchronous display the first and the second interface. For instance, the act 908 can involve providing, for synchronous display, the first interface via the requestor mobile computing device and the second interface via the requestor autonomous vehicle display (e.g., providing information to be synchronously displayed on a first interface via a requestor mobile computing device and on a second interface via a requestor autonomous vehicle display).

In various implementations, the series of acts 900 includes an additional act of receiving an interaction corresponding to the digital transportation request based on interaction by the requestor via the first interface of the requestor mobile computing device; and receiving an additional interaction corresponding to the digital transportation request based on interaction by the requestor via the second interface of the requestor autonomous vehicle display. In some cases, the series of acts 900 includes an additional act of determining a second ride state based on the signals of the requestor mobile computing device or the signals of the autonomous vehicle computing device, generating a third interface and a fourth interface based on the ride state, and providing, for synchronous display, the third interface via the requestor mobile computing device and the fourth interface via the requestor autonomous vehicle display.

In additional implementations, the series of acts 900 includes further acts of providing, for synchronous display, a shared selectable element on the first interface via the requestor mobile computing device and the second interface via the requestor autonomous vehicle display. In one or more implementations, the series of acts 900 includes an act where the shared selectable element comprises: a start ride element, an edit ride element, a controls element, a communication element, a pull over element, or a safety tools element.

In one or more embodiments, the series of acts 900 includes an additional act of receiving a GPS signal from the autonomous vehicle computing device or the requestor mobile computing device, based on the GPS signal determining a pulling-over state and in response to determining the pulling-over state, providing, for synchronous display, a stay-in-vehicle notification. In some cases, the series of acts 900 also includes an additional act of receiving a GPS signal from the autonomous vehicle computing device or the requestor mobile computing device, based on the GPS signal, determining an arrival state, and in response to determining an arrival state, provide, for synchronous display, an exit-vehicle notification.

In some cases, the series of acts 900 includes an additional act of providing, for synchronous display, a mode selectable element, and in response to detecting interaction with the mode selectable element, modifying a plurality of vehicle settings, wherein modifying the plurality of vehicle settings comprises modifying at least two of: vehicle lighting, media content, volume, or climate.

In some embodiments, the series of acts 900 includes in response to receiving an additional digital transportation request from an additional requestor mobile computing device corresponding to an additional requestor, monitoring signals of the additional requestor mobile computing device and signals of the autonomous vehicle computing device; and determining an additional ride state based on the signals of the additional requestor mobile computing device and the signals of the autonomous vehicle computing device.

In addition, the series of acts 900 can also generating a third interface and a fourth interface based on the additional ride state; and providing, for synchronous display, the third interface via the additional requestor mobile computing device and the fourth interface via the requestor autonomous vehicle display.

Moreover, in one or more implementations, the series of acts 900 includes receiving an additional digital transportation request from an additional requestor mobile computing device corresponding to an additional requestor; and selecting, from the plurality of autonomous vehicle providers, an additional autonomous vehicle corresponding to an additional autonomous vehicle provider for responding to the additional digital transportation request.

Further, in one or more implementations, the series of acts 900 includes providing, for synchronous display, a third interface, via the additional requestor mobile computing device, and a fourth interface, via the additional requestor autonomous vehicle display through the additional autonomous vehicle provider.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 10:
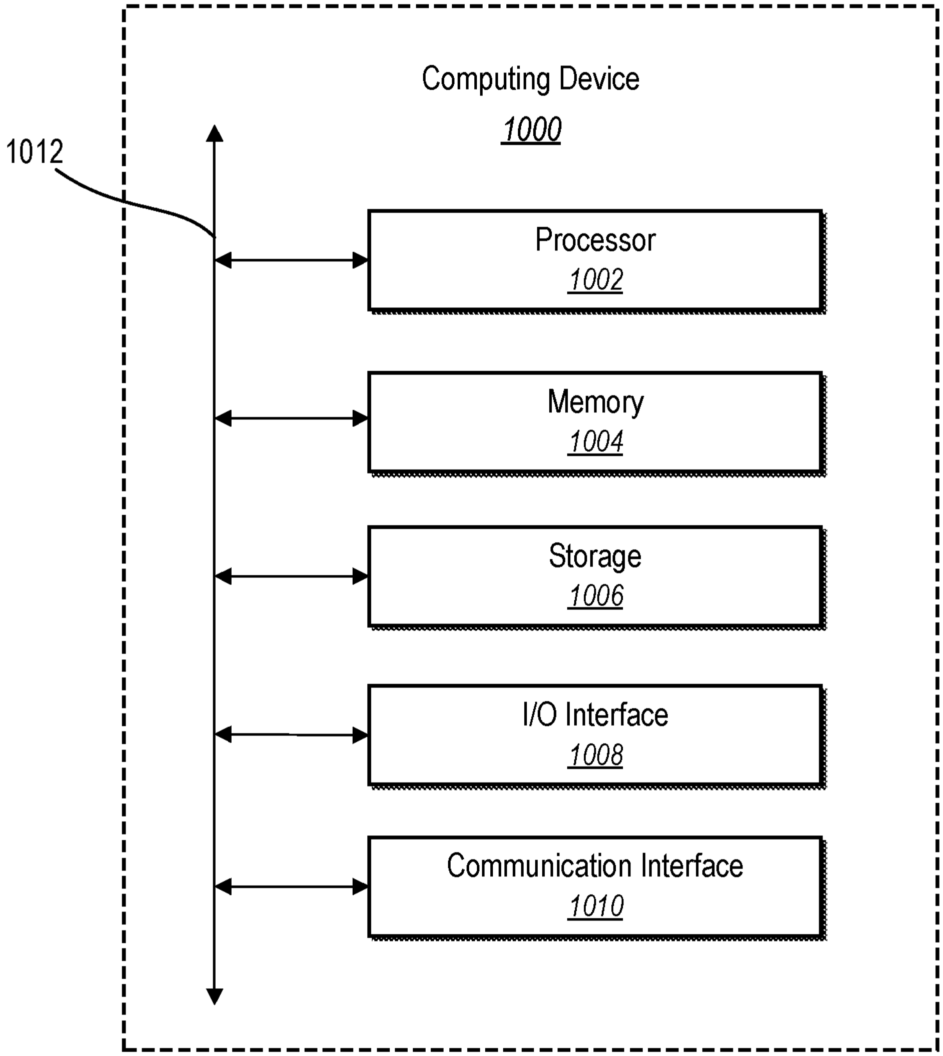
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 106, the requestor mobile computing device 112 or autonomous vehicle computing device 114). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 812). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes the memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes the storage device 1006 for storing data or instructions. As an example, and not by way of limitation, the storage device 1006 can include a non-transitory storage medium described above. The storage device 1006 may include a hard disk drive ("HDD"), flash memory, a Universal Serial Bus ("USB") drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include the bus 1012. The bus 1012 can include hardware, software, or both that connects components of computing device 1000 to each other.

Each of the components of the autonomous vehicle synchronization system 102 can include software, hardware, or both. For example, the components can include one or more instructions stored on a computer-readable storage medium and executable by processors of one or more computing devices, such as a client device or server device. When executed by the one or more processors, the computer-executable instructions of the autonomous vehicle synchronization system 102 can cause the computing device(s) to perform the methods described herein. Alternatively, the components can include hardware, such as a special purpose processing device to perform a certain function or group of functions. Alternatively, the components of the autonomous vehicle synchronization system 102 can include a combination of computer-executable instructions and hardware.

Furthermore, the components of the autonomous vehicle synchronization system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

Figure 11:
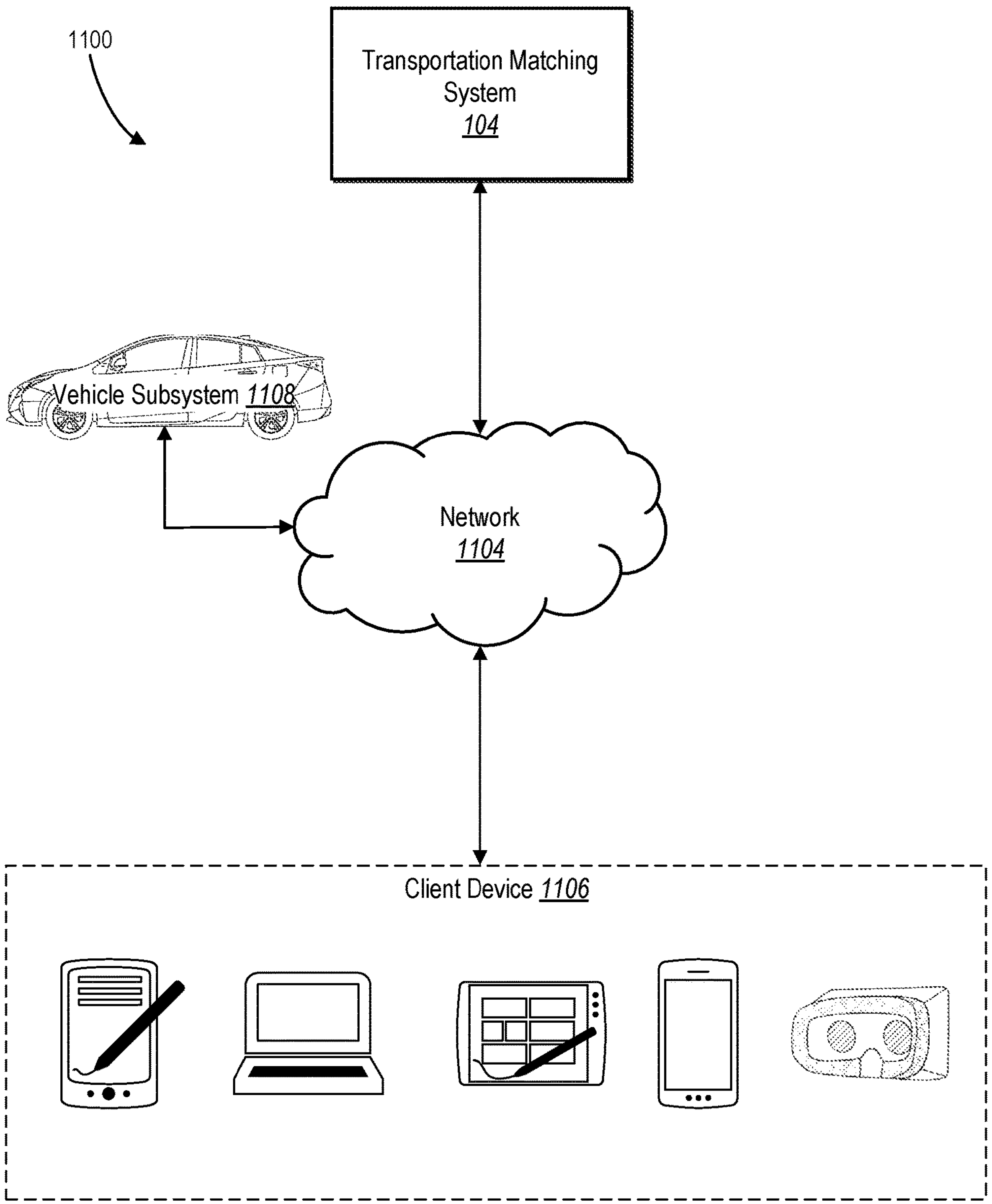
FIG. 11 illustrates an example environment for a transportation matching system in accordance with one or more embodiments.

FIG. 11 illustrates an example network environment 1100 of an autonomous vehicle synchronization system (e.g., the autonomous vehicle synchronization system 102). The network environment 1100 includes a client device 1106, an autonomous vehicle synchronization system 102, and a vehicle subsystem 1108 connected to each other by a network 1104. Although FIG. 9 illustrates a particular arrangement of the client device 1106, the autonomous vehicle synchronization system 102, the vehicle subsystem 1108, and the network 1104, this disclosure contemplates any suitable arrangement of the client device 1106, the autonomous vehicle synchronization system 102, the vehicle subsystem 1108, and the network 1104. As an example, and not by way of limitation, two or more of the client device 1106, the autonomous vehicle synchronization system 102, and the vehicle subsystem 1108 communicate directly, bypassing the network 1104. As another example, two or more of the client device 1106, the autonomous vehicle synchronization system 102, and the vehicle subsystem 1108 may be physically or logically co-located with each other in whole or in part. Moreover, although FIG. 9 illustrates a particular number of the client devices 1106, the autonomous vehicle synchronization system 102, the vehicle subsystems 1108, and the networks 1104, this disclosure contemplates any suitable number of the client devices 1106, the autonomous vehicle synchronization system 102, the vehicle subsystems 1108, and the networks 1104. As an example, and not by way of limitation, the network environment 1100 may include multiple client devices 1106, autonomous vehicle synchronization system 102, multiple vehicle subsystems 1108, and multiple networks 1104.

This disclosure contemplates any suitable network 1104. As an example, and not by way of limitation, one or more portions of the network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. The network 1104 may include one or more networks 1104.

Links may connect the client device 1106, the autonomous vehicle synchronization system 102, and the vehicle subsystem 1108 to the network 1104 or to each other. This disclosure contemplates any suitable links. In particular embodiments, one or more links include one or more wireline (such as, for example, Digital Subscriber Line ("DSL") or Data Over Cable Service Interface Specification ("DOCSIS")), wireless (such as, for example, Wi-Fi or Worldwide Interoperability for Microwave Access ("WiMAX")), or optical (such as, for example, Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1100. One or more first links may differ in one or more respects from one or more second links.

In particular embodiments, the client device 1106 may be an electronic device including hardware, software, or embedded logic components or a combination of two or more such components and capable of carrying out the appropriate functionalities implemented or supported by the client device 1106. As an example, and not by way of limitation, a client device 1106 may include any of the computing devices discussed above in relation to FIG. 8. A client device 1106 may enable a network user at the client device 1106 to access a network. A client device 1106 may enable its user to communicate with other users at other client devices 1106.

In particular embodiments, the client device 1106 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1106 may enter a Uniform Resource Locator ("URL") or other address directing the web browser to a particular server (such as the server(s) 106), and the web browser may generate a Hyper Text Transfer Protocol ("HTTP") request and communicate the HTTP request to the server. The server may accept the HTTP request and communicate to the client device 1106 one or more Hyper Text Markup Language ("HTML") files responsive to the HTTP request. The client device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the autonomous vehicle synchronization system 102 may be a network-addressable computing system that can host a ride share transportation network. The autonomous vehicle synchronization system 102 may generate, store, receive, and send data, such as, for example, user-profile data, concept-profile data, text data, ride request data, GPS location data, provider data, requestor data, vehicle data, or other suitable data related to the ride share transportation network. This may include authenticating the identity of providers and/or vehicles who are authorized to provide ride services through the autonomous vehicle synchronization system 102. In addition, the transportation service system may manage identities of service requestors such as users/requestors. In particular, the transportation service system may maintain requestor data such as driving/riding histories, personal data, or other user data in addition to navigation and/or traffic management services or other location services (e.g., GPS services).

In particular embodiments, the autonomous vehicle synchronization system 102 may manage ride matching services to connect a user/requestor with a vehicle and/or provider. By managing the ride matching services, the autonomous vehicle synchronization system 102 can manage the distribution and allocation of vehicle subsystem resources and user resources such as GPS location and availability indicators, as described herein.

The autonomous vehicle synchronization system 102 may be accessed by the other components of the network environment 1100 either directly or via network 1104. In particular embodiments, the autonomous vehicle synchronization system 102 may include one or more server(s). Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the autonomous vehicle synchronization system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable the client device 1106 or the autonomous vehicle synchronization system 102 to manage, retrieve, modify, add, or delete, the information stored in data storage.

In particular embodiments, the autonomous vehicle synchronization system 102 may provide users with the ability to take actions on various types of items or objects, supported by the autonomous vehicle synchronization system 102. As an example, and not by way of limitation, the items and objects may include ride share networks to which users of the autonomous vehicle synchronization system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the autonomous vehicle synchronization system 102 or by an external system of a third-party system, which is separate from the autonomous vehicle synchronization system 102 and coupled to the autonomous vehicle synchronization system 102 via the network 1104.

In particular embodiments, the autonomous vehicle synchronization system 102 may be capable of linking a variety of entities. As an example, and not by way of limitation, the autonomous vehicle synchronization system 102 may enable users to interact with each other or other entities, or to allow users to interact with these entities through an application programming interfaces ("API") or other communication channels.

In particular embodiments, the autonomous vehicle synchronization system 102 may include a variety of servers, sub-systems, programs, modules, logs, and data stores. In particular embodiments, the autonomous vehicle synchronization system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The autonomous vehicle synchronization system 102 may also include suitable components such as network interfaces, security mechanisms, load balancers, failover servers, management-and-network-operations consoles, other suitable components, or any suitable combination thereof. In particular embodiments, the autonomous vehicle synchronization system 102 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the autonomous vehicle synchronization system 102 and one or more client devices 1106. An action logger may be used to receive communications from a web server about a user's actions on or off the autonomous vehicle synchronization system 102. In conjunction with the action log, a third-party-content-object log may be maintained of user exposures to third-party-content objects. A notification controller may provide information regarding content objects to the client device 1106. Information may be pushed to the client device 1106 as notifications, or information may be pulled from the client device 1106 responsive to a request received from the client device 1106. Authorization servers may be used to enforce one or more privacy settings of the users of the autonomous vehicle synchronization system 102. A privacy setting of a user determines how particular information associated with a user can be shared. The authorization server may allow users to opt in to or opt out of having their actions logged by the autonomous vehicle synchronization system 102 or shared with other systems, such as, for example, by setting appropriate privacy settings. Third-party-content-object stores may be used to store content objects received from third parties. Location stores may be used for storing location information received from the client devices 1106 associated with users.

In addition, the vehicle subsystem 1108 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1108 can include an autonomous vehicle—e.g., a vehicle that does not require a human operator. In these embodiments, the vehicle subsystem 1108 can perform maneuvers, communicate, and otherwise function without the aid of a human provider, in accordance with available technology.

In particular embodiments, the vehicle subsystem 1108 may include one or more sensors incorporated therein or associated thereto. For example, sensor(s) can be mounted on the top of the vehicle subsystem 1108 or else can be located within the interior of the vehicle subsystem 1108. In certain embodiments, the sensor(s) can be located in multiple areas at once—i.e., split up throughout the vehicle subsystem 1108 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor suite can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 1108 may include a communication device capable of communicating with the client device 1106 and/or the autonomous vehicle synchronization system 102. For example, the vehicle subsystem 1108 can include an on-board computing device communicatively linked to the network 1104 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving a digital transportation request from a requestor mobile computing device corresponding to a requestor;

selecting, from a plurality of autonomous vehicle providers, an autonomous vehicle corresponding to an autonomous vehicle provider for responding to the digital transportation request;

monitoring signals of the requestor mobile computing device and signals of an autonomous vehicle computing device of the autonomous vehicle corresponding to the autonomous vehicle provider, the autonomous vehicle computing device comprising a requestor autonomous vehicle display;

determining a ride state based on the signals of the requestor mobile computing device and the signals of the autonomous vehicle computing device;

generating a first interface and a second interface based on the ride state; and providing information to be synchronously displayed on the first interface via the requestor mobile computing device and on the second interface via the requestor autonomous vehicle display.

2. The computer-implemented method of claim 1, further comprising:

in response to receiving an additional digital transportation request from an additional requestor mobile computing device corresponding to an additional requestor, monitoring signals of the additional requestor mobile computing device and signals of the autonomous vehicle computing device; and determining an additional ride state based on the signals of the additional requestor mobile computing device and the signals of the autonomous vehicle computing device.

3. The computer-implemented method of claim 2, further comprising:

generating a third interface and a fourth interface based on the additional ride state; and providing, for synchronous display, the third interface via the additional requestor mobile computing device and the fourth interface via the requestor autonomous vehicle display.

4. The computer-implemented method of claim 1, further comprising:

receiving an additional digital transportation request from an additional requestor mobile computing device corresponding to an additional requestor; and selecting, from the plurality of autonomous vehicle providers, an additional autonomous vehicle corresponding to an additional autonomous vehicle provider for responding to the additional digital transportation request.

5. The computer-implemented method of claim 4, further comprising providing, for synchronous display, a third interface, via the additional requestor mobile computing device, and a fourth interface, via an additional requestor autonomous vehicle display through the additional autonomous vehicle provider.

6. The computer-implemented method of claim 1, further comprising:

receiving an interaction corresponding to the digital transportation request based on interaction by the requestor via the first interface of the requestor mobile computing device; and receiving an additional interaction corresponding to the digital transportation request based on interaction by the requestor via the second interface of the requestor autonomous vehicle display.

7. The computer-implemented method of claim 1, further comprising:

determining a second ride state based on the signals of the requestor mobile computing device or the signals of the autonomous vehicle computing device;

generating a third interface and a fourth interface based on the ride state; and providing, for synchronous display, the third interface via the requestor mobile computing device and the fourth interface via the requestor autonomous vehicle display.

8. The computer-implemented method of claim 1 further comprising:

providing, for synchronous display, a mode selectable element; and in response to detecting interaction with the mode selectable element, modifying a plurality of vehicle settings, wherein modifying the plurality of vehicle settings comprises modifying at least two of: vehicle lighting, media content, volume, or climate.

9. A system comprising:

at least one processor; and a non-transitory computer readable storage medium comprising instructions that, when executed by the at least one processor, cause the system to:

receive a digital transportation request from a requestor mobile computing device corresponding to a requestor;

select, from a plurality of autonomous vehicle providers, an autonomous vehicle corresponding to an autonomous vehicle provider for responding to the digital transportation request;

monitor signals of the requestor mobile computing device and signals of an autonomous vehicle computing device of the autonomous vehicle corresponding to the autonomous vehicle provider, the autonomous vehicle computing device comprising a requestor autonomous vehicle display;

determine a ride state based on the signals of the requestor mobile computing device and the signals of the autonomous vehicle computing device;

generate a first interface and a second interface based on the ride state; and provide information to be synchronously displayed on the first interface via the requestor mobile computing device and on the second interface via the requestor autonomous vehicle display.

10. The system of claim 9, further comprising instructions that, when executed by the at least one processor, cause the system to:

in response to receiving an additional digital transportation request from an additional requestor mobile computing device corresponding to an additional requestor, monitor signals of the additional requestor mobile computing device and signals of the autonomous vehicle computing device; and determine an additional ride state based on the signals of the additional requestor mobile computing device and the signals of the autonomous vehicle computing device.

11. The system of claim 10, further comprising instructions that, when executed by the at least one processor, cause the system to:

generate a third interface and a fourth interface based on the additional ride state; and provide, for synchronous display, the third interface via the additional requestor mobile computing device and the fourth interface via the requestor autonomous vehicle display.

12. The system of claim 9, further comprising instructions that, when executed by the at least one processor, cause the system to:

receive an additional digital transportation request from an additional requestor mobile computing device corresponding to an additional requestor; and select, from the plurality of autonomous vehicle providers, an additional autonomous vehicle corresponding to an additional autonomous vehicle provider for responding to the additional digital transportation request.

13. The system of claim 12, further comprising instructions that, when executed by the at least one processor, cause the system to provide, for synchronous display, a third interface, via the additional requestor mobile computing device, and a fourth interface, via an additional requestor autonomous vehicle display through the additional autonomous vehicle provider.

14. The system of claim 12, further comprising instructions that, when executed by the at least one processor, cause the system to:

receive an interaction corresponding to the digital transportation request based on interaction by the requestor via the first interface of the requestor mobile computing device; and receive an additional interaction corresponding to the digital transportation request based on interaction by the requestor via the second interface of the requestor autonomous vehicle display.

15. The system of claim 9, further comprising instructions that, when executed by the at least one processor, cause the system to:

determine a second ride state based on the signals of the requestor mobile computing device and the signals of the autonomous vehicle computing device;

generate a third interface and a fourth interface based on the ride state; and provide, for synchronous display, the second interface via the requestor mobile computing device and the fourth interface via the requestor autonomous vehicle display.

16. A non-transitory computer readable storage medium comprising instructions that, when executed by at least one processor, cause the at least one processor to:

receive a digital transportation request from a requestor mobile computing device corresponding to a requestor;

select, from a plurality of autonomous vehicle providers, an autonomous vehicle corresponding to an autonomous vehicle provider for responding to the digital transportation request;

monitor signals of the requestor mobile computing device and signals of an autonomous vehicle computing device of the autonomous vehicle corresponding to the autonomous vehicle provider, the autonomous vehicle computing device comprising a requestor autonomous vehicle display;

determine a ride state based on the signals of the requestor mobile computing device and the signals of the autonomous vehicle computing device;

generate a first interface and a second interface based on the ride state; and provide information to be synchronously displayed on the first interface via the requestor mobile computing device and on the second interface via the requestor autonomous vehicle display.

17. The non-transitory computer readable storage medium of claim 16, further comprising instructions that, when executed by the at least one processor, cause the at least one processor to:

in response to receiving an additional digital transportation request from an additional requestor mobile computing device corresponding to an additional requestor, monitor signals of the additional requestor mobile computing device and signals of the autonomous vehicle computing device; and determine an additional ride state based on the signals of the additional requestor mobile computing device and the signals of the autonomous vehicle computing device.

18. The non-transitory computer readable storage medium of claim 17, further comprising instructions that, when executed by the at least one processor, cause the at least one processor to:

generate a third interface and a fourth interface based on the additional ride state; and provide, for synchronous display, the third interface via the additional requestor mobile computing device and the fourth interface via the requestor autonomous vehicle display.

19. The non-transitory computer readable storage medium of claim 16, further comprising instructions that, when executed by the at least one processor, cause the at least one processor to:

receive an additional digital transportation request from an additional requestor mobile computing device corresponding to an additional requestor; and select, from the plurality of autonomous vehicle providers, an additional autonomous vehicle corresponding to an additional autonomous vehicle provider for responding to the additional digital transportation request.

20. The non-transitory computer readable storage medium of claim 19, further comprising instructions that, when executed by the at least one processor, cause the at least one processor to provide, for synchronous display, a third interface, via the additional requestor mobile computing device, and a fourth interface, via an additional requestor autonomous vehicle display through the additional autonomous vehicle provider.

* * * * *